United States Patent
Lee

(10) Patent No.: US 12,238,288 B2
(45) Date of Patent: Feb. 25, 2025

(54) VIDEO DECODING METHOD AND DEVICE

(71) Applicant: SAMSUNG ELECTRONICS CO., LTD., Suwon-si (KR)

(72) Inventor: Sun Young Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/408,484

(22) Filed: Jan. 9, 2024

(65) Prior Publication Data

US 2024/0155127 A1    May 9, 2024

Related U.S. Application Data

(63) Continuation of application No. 18/048,816, filed on Oct. 21, 2022, now Pat. No. 11,909,973, which is a
(Continued)

(30) Foreign Application Priority Data

Mar. 27, 2020 (KR) .................. 10-2020-0037703
Nov. 25, 2020 (KR) .................. 10-2020-0160112
Nov. 25, 2020 (KR) .................. 10-2020-0160114

(51) Int. Cl.
*H04N 19/122* (2014.01)
*H04N 19/103* (2014.01)
(Continued)

(52) U.S. Cl.
CPC ......... *H04N 19/122* (2014.11); *H04N 19/103* (2014.11); *H04N 19/136* (2014.11);
(Continued)

(58) Field of Classification Search
None
See application file for complete search history.

(56) References Cited

U.S. PATENT DOCUMENTS 11,595,656 B2 *  2/2023  Chuang .................. H04N 19/18
2019/0387241 A1  12/2019  Kim et al.
(Continued)

FOREIGN PATENT DOCUMENTS

CN    108632611 A    10/2018
CN    110365982 A    10/2019
(Continued)

OTHER PUBLICATIONS

Benjamin Bross et al., 'Versatile Video Coding (Draft 8)', JVET-Q2001-vE, Joint Video Experts Team (JVET)of ITU-T SG 16 WP 3 and ISO/IEC JTC 1/SC 29/WG 11 17th Meeting: Brussels, BE, pp. 1-481, Mar. 12, 2020, Sections 7.3.2.3-7.3.10.11, 7.4.3.3, 7.4.11.5, 8.7.4.1; and Table 39.
(Continued)

*Primary Examiner* — Christopher G Findley
(74) *Attorney, Agent, or Firm* — Sughrue Mion, PLLC

(57) ABSTRACT

Provided are a video decoding method and device. This specification provides a video decoding method comprising the steps of: acquiring a parameter indicating whether a multiple transform set is applicable to a block to be decoded, as well as information about the width of the block to be decoded and the height of the block to be decoded; determining the transform type of the block to be decoded on the basis of at least one of the parameter indicating whether a multiple transform set is applicable, or the information about the width and height of the block to be decoded, and setting a zero-out region of the block to be decoded; and inverse-transforming the block to be decoded on the basis of the zero-out region of the block to be decoded and the result of determining the transform type.

1 Claim, 13 Drawing Sheets

Related U.S. Application Data continuation of application No. 17/667,444, filed on Feb. 8, 2022, now Pat. No. 11,516,471, which is a continuation of application No. PCT/KR2020/018466, filed on Dec. 16, 2020.

(51) Int. Cl.
    *H04N 19/136*     (2014.01)
    *H04N 19/176*     (2014.01)
    *H04N 19/60*     (2014.01)
    *H04N 19/70*     (2014.01)

(52) U.S. Cl.
    CPC ........... *H04N 19/176* (2014.11); *H04N 19/60* (2014.11); *H04N 19/70* (2014.11)

(56) References Cited

U.S. PATENT DOCUMENTS

| | | | |
|---|---|---|---|
| 2022/0109878 A1* | 4/2022 | Koo | H04N 19/176 |
| 2022/0417518 A1* | 12/2022 | Koo | H04N 19/18 |
| 2023/0199186 A1 | 6/2023 | Kim et al. | |
| 2023/0328288 A1 | 10/2023 | Koo et al. | |

FOREIGN PATENT DOCUMENTS

| | | |
|---|---|---|
| KR | 10-2016-0040838 A | 4/2016 |
| KR | 10-2018-0018570 A | 2/2018 |
| KR | 10-2018-0041211 A | 4/2018 |
| KR | 10-2020-0007671 A | 1/2020 |
| WO | 2020/060364 A1 | 3/2020 |
| WO | 2020/162732 A1 | 8/2020 |

OTHER PUBLICATIONS

Jianle Chen et al., 'Algorithm description for Versatile Video Coding and Test Model 8 (VTM 8)', JVET-Q2002-v3, Joint Video Experts Team (JVET) of ITU-T SG 16 WP 3 and ISO/IEC JTC 1/SC 29/WG 11 17th Meeting: Brussels, BE, pp. 1-97, Mar. 24, 2020, Sections 3.5.1-3.5.2.

International Search Report & Written Opinion of the International Searching Authority dated Mar. 15, 2021.
Communication issued on Apr. 18, 2024 by the Korean Intellectual Property Office for Korean Patent Application No. 10-2021-0132119.
Communication issued on Apr. 3, 2024 by the China National Intellectual Property Administration for Chinese Patent Application No. 202080050502.9.
Chen, Jianle et al. (2019). "Algorithm description for Versatile Video Coding and Test Model 5 (VTM 5)", Joint Video Experts Team (JVET) of ITU-T SG 16 WP 3 and ISO/IEC JTC I/SC 29/WG 11. JVET-N1002-v2.
Extended European Search Report for EP 20927108.9 by European Patent Office dated Aug. 25, 2023.
Examination Report for IN 202217042917 by Intellectual Property India dated Feb. 7, 2023.
Office Action for JP 2022-504296 by Japan Patent Office dated Aug. 22, 2023.
Bross, Benjamin et al. (2020). "Versatile Video Coding (Draft 8)", Joint Video Experts Team (JVET) of ITU-T SG 16 WP 3 and ISO/IEC JTC I/SC 29/WG 11. JVET-Q2001-vE.
Office Action for JP 2022-504296 by Japan Patent Office dated Mar. 14, 2023.
Chen, Jianle et al. (2020). "Algorithm description for Versatile Video Coding and Test Model 8 (VTM 8)", Joint Video Experts Team (JVET) of ITU-T SG 16 WP 3 and ISO/IEC JTC I/SC 29/WG 11. JVET-Q2002-v3.
Communication issued Jul. 30, 2024 by the Indonesia Intellectual Property Office in Indonesian Patent Application No. P00202208126.
Communication issued Dec. 4, 2024 by the Korean Intellectual Property Office in Korean Patent Application No. 10-2021-0132119.
Nguyen, Tung et al., "MTS dependent coefficient subblock scanning for zero-out", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q0448-v1. (8 pages total).
Communication issued Oct. 22, 2024 by the National Intellectual Property Administration, PRC in Chinese Patent Application No. 202080050502.9.
Communication issued Dec. 29, 2024 by the Japan Patent Office in Japanese Patent Application No. 2024-025878.

\* cited by examiner

VIDEO DECODING METHOD AND DEVICE

This application is a continuation of U.S. patent application Ser. No. 18/048,816 filed on Oct. 21, 2022, which is a continuation of U.S. patent application Ser. No. 17/667,444 filed on Feb. 8, 2022, now U.S. Pat. No. 11,516,471 issued on Nov. 29, 2022, which is a continuation of International Application No. PCT/KR2020/018466 filed on Dec. 16, 2020, which claims priority to Korean Patent Application No. KR 10-2020-0037703 filed on Mar. 27, 2020 in Korean Intellectual Property Office, Korean Patent Application No. KR 10-2020-0160112 filed on Nov. 25, 2020 in Korean Intellectual Property Office, and Korean Patent Application No. KR 10-2020-0160114 filed on Nov. 25, 2020 in Korean Intellectual Property Office, the entire contents of which are hereby incorporated by reference in their entireties.

TECHNICAL FIELD

The present invention relates to a video coding technique, and more specifically, to a method of determining a primary transform type of a decoding target block in the process of decoding a video.

BACKGROUND ART

Recently, demand for high-resolution and high-quality videos, such as high definition (HD) videos and ultra-high definition (UHD) videos, is increasing in various fields. Since the amount of information or bits to be transmitted relatively increases compared to existing video data as the resolution and quality of video data are getting higher, transmission and storage costs increase when the video data are stored using a medium such as a conventional wired or wireless broadband line.

As realistic video and virtual reality services using 4K or 8K video images have been expanded after the HEVC video codec is enacted in 2013, standardization works for Versatile Video Coding (VVC), which is a next-generation video codec aiming at improving performance more than twice compared to HEVC, have begun, and the standardization works are actively in progress presently. VVC is being developed by the Joint Video Exploration Team (JVET) jointly organized by ISO/ICE MPEG (Moving Picture Experts Group) and ITU-T VCEG (Joint Video Exploration Team), which are video encoding standardization groups, in order to improve encoding compression performance more than twice compared to HEVC. For the standardization of VVC, as a call for proposal has been announced at the 121st MPEG and 9th JVET meeting in Gwangju in January 2018, and a total of 23 institutions have proposed video codec techniques at the 122nd MPEG and 10th JVET meeting in San Diego, video standardization has begun in full scale. At the 122nd MPEG and 10th JVET meeting, technical reviews on the video codec techniques proposed by the institutions and evaluations on the objective compression performance and subjective video quality have been performed, and some of the techniques are adopted and released as the Working Draft (WD) 1.0 and video reference software VTM (VVC Test Mode) 1.0. For the VVC standard, the Committee Draft (CD) has been completed after the 127th MPEG and 15th JVET meeting in July 2019, and standardization is in progress with the goal of enacting the Final Draft International Standard (FDIS) in October 2020.

In the encoding structure of the existing HEVC for hierarchically splitting a video into a quadtree, VVC has adopted a partitioning block structure that combines a QuadTree Binary Tree (QTBT) and a Ternary Tree (TT). As the structure may generate or process prediction residual signals more flexibly compared to the HEVC, further improved compression performance can be achieved compared to the HEVC. In addition to this basic block structure, new techniques that are not used in existing codecs, such as adaptive loop filter technique (ALF), Affine Motion Prediction (AMP) as a motion prediction technique, and decoder-side motion vector refinement (DMVR), are adopted as standard techniques. DCT-II, which is a transform kernel mainly used in existing video codecs, is continuously used as a transform and quantization technique, and the size of an application block has been changed to apply a larger block size. In addition, application of the DST-7 kernel, which is applied to a small transform block such as a 4×4 block in the existing HEVC, has been expanded to a large transform block, and even DCT-8, which is a new transform kernel, has been added as a transform kernel.

Meanwhile, in the HEVC standard, it does not need to transmit information on the transform type of a video since the transform is performed using one transform type in encoding or decoding a video. However, since Multiple Transform Selection that uses DCT-II, DCT-8, and DCT-7 may be applied in the new techniques, a technique for defining whether an MTS will be applied and which type of primary transform is applied when decoding is performed is required.

DISCLOSURE OF INVENTION

Technical Problem

An object of the present invention is to perform an inverse transform in a predefined method under a specific condition.

Another object of the present invention is performing decoding by applying a transform type optimized to a decoding target block.

Technical Solution

To accomplish the above objects, according to one aspect of the present invention, there is provided a video decoding method performed by a video decoding device. The video decoding method comprises the steps of: obtaining information on a parameter indicating whether a multiple transform set (MTS) can be applied to a decoding target block, a width of the decoding target block, and a height of the decoding target block; determining a transform type of the decoding target block on the basis of at least one among the parameter indicating whether a multiple transform set (MTS) can be applied to a decoding target block, the width of the decoding target block, and the height of the decoding target block; setting a zero-out area of the decoding target block on the basis of at least one among the parameter indicating whether a multiple transform set (MTS) can be applied to a decoding target block, the width of the decoding target block, and the height of the decoding target block; and performing an inverse transform on the decoding target block on the basis of a result of determining the zero-out area and the transform type of the decoding target block.

According to another aspect of the present invention, the step of determining a transform type of the decoding target block includes the step of determining that the decoding target block is transformed using a default transform, when at least one among the width and the height of the decoding target block has a value greater than 32.

According to another aspect of the present invention, the step of setting a zero-out area includes the step of setting an area of which the width or the height of the decoding target block is greater than 32 as a zero-out area, when one among the width and the height of the decoding target block has a value greater than 32.

According to another aspect of the present invention, the parameter indicating whether a multiple transform set can be applied to a decoding target block is sps_mts_enabled_flag.

According to another aspect of the present invention, there is provided a video decoding method performed by a video decoding device, the method comprising the steps of: obtaining at least one among information on whether a multiple transform set (MTS) is applied to a decoding target block, information on a prediction mode, information on whether a secondary transform is applied, information on whether a prediction using a matrix is applied, and information on a size of the decoding target block; determining whether an implicit multiple transform set is applied to the decoding target block on the basis of at least one among the information on whether a multiple transform set is applied to a decoding target block, the information on a prediction mode, the information on whether a secondary transform is applied, and the information on whether a prediction using a matrix is applied; obtaining information on a transform type on the basis of information on whether an implicit multiple transform set is applied to the decoding target block and the information on a size of the decoding target block; and performing an inverse transform on the basis of the information on a transform type.

According to another aspect of the present invention, the step of determining whether an implicit multiple transform set is applied includes the step of determining whether the implicit multiple transform set is applied by using the information on whether a multiple transform set (MTS) is applied to a decoding target block, the information on a prediction mode, the information on whether a secondary transform is applied, and the information on whether a prediction using a matrix is applied.

According to another aspect of the present invention, the implicit multiple transform set includes one default transform and at least one extra transform.

According to another aspect of the present invention, at the step of obtaining information on a transform type on the basis of the information on a size of the decoding target block, when a horizontal axis length of the decoding target block is between 4 and 16, at least one among the extra transform types is applied to the decoding target block in a horizontal axis direction.

According to another aspect of the present invention, at the step of obtaining information on a transform type on the basis of the information on a size of the decoding target block, when a vertical axis length of the decoding target block is between 4 and 16, at least one among the extra transform types is applied to the decoding target block in a vertical axis direction.

According to another aspect of the present invention, the information on whether a multiple transform set (MTS) is applied to a decoding target block includes at least one among sps_mts_enabled_flag and sps_explicit_mts_intra_enabled_flag.

According to another aspect of the present invention, the information on a prediction mode includes CuPredMode.

According to another aspect of the present invention, the information on whether a secondary transform is applied includes lfnst_idx.

According to another aspect of the present invention, the information on whether a prediction using a matrix is applied includes intra_mip_flag.

According to another aspect of the present invention, the information on a transform type of the decoding target block includes information on a horizontal axis transform type and information on a vertical axis transform type.

According to another aspect of the present invention, the step of determining whether an implicit multiple transform set is applied to the decoding target block is obtained by additionally confirming whether the decoding target block is a luma block.

According to another aspect of the present invention, there is provided a video decoding device comprising a memory and at least one processor. The video decoding device comprises at least one processor including an inverse transform unit for obtaining at least one among information on whether a multiple transform set (MTS) is applied to a decoding target block, information on a prediction mode, information on whether a secondary transform is applied, information on whether a prediction using a matrix is applied, and information on a size of the decoding target block; determining whether an implicit multiple transform set is applied to the decoding target block on the basis of at least one among the information on whether a multiple transform set is applied to a decoding target block, the information on a prediction mode, the information on whether a secondary transform is applied, and the information on whether a prediction using a matrix is applied; obtaining information on a transform type on the basis of information on whether an implicit multiple transform set is applied to the decoding target block and the information on a size of the decoding target block; and performing an inverse transform on the basis of the information on a transform type.

Advantageous Effects

According to the present invention, an inverse transform may be performed in a predefined method under a specific condition.

In addition, an effect of improving compression performance can be expected by performing decoding by applying a transform type optimized to a decoding target block.

BEST MODE FOR CARRYING OUT THE INVENTION

Figure 1:
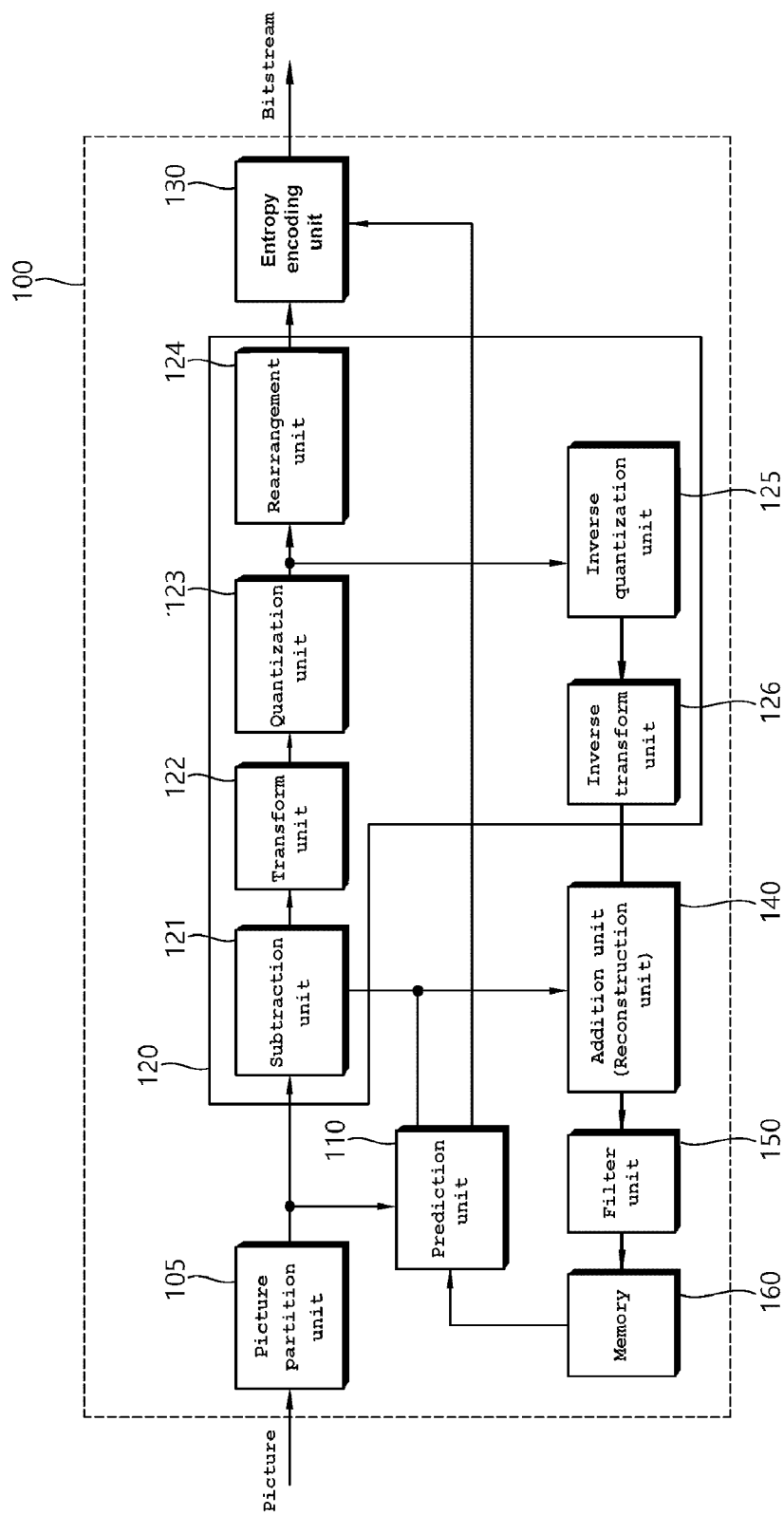
FIG. 1 is a view schematically showing the configuration of a video encoding device to which the present invention may be applied.

Since the present invention may make various modifications and provide various embodiments, specific embodiments will be illustrated in the drawings and described in detail. However, this is not intended to limit the present invention to the specific embodiments. The terms used in this specification are used only to describe the specific embodiments and not intended to limit the technical spirit of the present invention. Singular expressions include plural expressions unless the context clearly indicates otherwise. It should be understood that in this specification, terms such as "include", "have" and the like are intended to indicate existence of features, numbers, steps, operations, components, parts, or combinations thereof described in the specification, and the possibility of existence or addition of one or more other features, numbers, steps, operations, components, parts or combinations thereof are not excluded in advance.

Meanwhile, each of the components in the drawings described in the present invention is independently illustrated for convenience of description on different characteristic functions, and does not mean that each of the components is implemented as separate hardware or software. For example, two or more components may be combined to form one component, or one component may be divided into a plurality of components. Embodiments in which each component is integrated and/or separated are also included in the scope of the present invention as far as it does not depart from the essence of the present invention.

Hereinafter, preferred embodiments of the present invention will be described in more detail with reference to the accompanying drawings. Hereinafter, the same reference numerals are used for the same components in the drawings, and duplicate descriptions for the same components are omitted.

Meanwhile, the present invention relates to video/image coding. For example, the methods/embodiments disclosed in the present invention may be applied to the methods disclosed in the versatile video coding (VVC) standard, the Essential Video Coding (EVC) standard, the AOMedia Video 1 (AV1) standard, the 2nd generation of audio video coding (AVS2) standard, or a next-generation video/image coding standard (e.g., H.267, H.268, etc.).

In this specification, a picture generally means a unit representing a video in a specific time period, and a slice is a unit constituting a part of a picture in coding. One picture may be configured of a plurality of slices, and if needed, the picture and the slice may be interchangeably used.

A pixel or a pel may mean a minimum unit constituting one picture (or video). In addition, 'sample' may be used as a term corresponding to the pixel. Generally, a sample may represent a pixel or a pixel value, and may represent only a pixel/pixel value of a luma component or may represent only a pixel/pixel value of a chroma component.

A unit represents a basic unit of video processing. The unit may include at least one among a specific area of a picture and information related to a corresponding area. The unit and the terms such as a block or an area may be interchangeably used depending on circumstances. Generally, an M×N block may represent a set of samples or transform coefficients configured of M columns and N rows.

FIG. 1 is a view schematically showing the configuration of a video encoding device to which the present invention may be applied.

Referring to FIG. 1, a video encoding device 100 may include a picture split unit 105, a prediction unit 110, a residual processing unit 120, an entropy encoding unit 130, an addition unit 140, a filter unit 150, and a memory 160. The residual processing unit 120 may include a subtraction unit 121, a transform unit 122, a quantization unit 123, a rearrangement unit 124, an inverse quantization unit 125, and an inverse transform unit 126.

The picture split unit 105 may split an input picture into at least one processing unit.

For example, a processing unit may be referred to as a coding unit (CU). In this case, the coding unit may be recursively split from a coding tree unit (CTU) according to a quad-tree binary-tree (QTBT) structure. For example, one coding unit may be split into a plurality of coding units of deeper depth on the basis of a quad tree structure and/or a binary tree structure. In this case, for example, the quad tree structure may be applied first, and the binary tree structure may be applied later. Alternatively, the binary tree structure may be applied first. A decoding procedure according to the present invention may be performed on the basis of a final coding unit that is not split any more. In this case, the largest coding unit itself may be used as the final coding unit on the basis of coding efficiency or the like according to video characteristics, or a coding unit may be recursively split into coding units of a further deeper depth as needed, and a coding unit of an optimal size may be used as a final coding unit. Here, the coding procedure may include a procedure such as prediction, transform, reconstruction or the like described below.

As another example, a processing unit may include a coding unit (CU), a prediction unit (PU), or a transform unit (TU). The coding unit may be split from the largest coding unit (LCU) into coding units of deeper depth according to a quad tree structure. In this case, the largest coding unit itself may be used as the final coding unit on the basis of coding efficiency or the like according to video characteristics, or a coding unit may be recursively split into coding units of a further deeper depth as needed, and a coding unit of an optimal size may be used as a final coding unit. When a smallest coding unit (SCU) is set, a coding unit may not be split into coding units smaller than the minimum coding unit. Here, a final coding unit means a coding unit that functions as a basis for partitioning or splitting a coding unit into prediction units or transform units. The prediction unit is a unit partitioned from a coding unit and may be a unit of sample prediction. At this point, the prediction unit may be split into subblocks. The transform unit may be split from a coding unit according to a quad tree structure, and may be a unit for inducing a transform coefficient and/or a unit for inducing a residual signal from the transform coefficient. Hereinafter, the coding unit may be referred to as a coding block (CB), the prediction unit may be referred to as a prediction block (PB), and the transform unit may be referred to as a transform block (TB). A prediction block or a prediction unit may mean a specific area of a block shape within a picture, and may include an array of prediction samples. In addition, a transform block or transform unit may mean a specific area of a block shape within a picture, and may include an array of transform coefficients or residual samples.

The prediction unit 110 may perform prediction on a processing target block (hereinafter, referred to as a current block) and generate a predicted block including prediction samples for the current block. The unit of prediction performed by the prediction unit 110 may be a coding block, a transform block, or a prediction block.

The prediction unit 110 may determine whether intra prediction or inter prediction is applied to the current block. For example, the prediction unit 110 may determine whether intra prediction or inter prediction is applied by the unit of CU.

In the case of intra prediction, the prediction unit 110 may derive a prediction sample for the current block on the basis of a reference sample outside the current block in a picture to which the current block belongs (hereinafter, referred to as a current picture). At this point, the prediction unit 110 may (i) derive a prediction sample on the basis of an average or interpolation of neighboring reference samples of the current block, and (ii) derive the prediction sample on the basis of a reference sample existing in a specific (prediction) direction with respect to the prediction sample among the neighboring reference samples of the current block. The case of (i) may be referred to as a non-directional mode or a non-angular mode, and the case of (ii) may be referred to as a directional mode or an angular mode. In the intra prediction, a prediction mode may have, for example, 33 directional prediction modes and at least two non-directional modes. The non-directional mode may include a DC prediction mode and a planar mode. The prediction unit 110 may determine a prediction mode applied to the current block by using the prediction mode applied to neighboring blocks.

In the case of inter prediction, the prediction unit 110 may derive a prediction sample for the current block on the basis of a sample specified by a motion vector on a reference picture. The prediction unit 110 may derive a prediction sample for the current block by applying any one among a skip mode, a merge mode, and a motion vector prediction (MVP) mode. In the case of the skip mode and the merge mode, the prediction unit 110 may use motion information of a neighboring block as motion information of the current block. In the case of the skip mode, unlike the merge mode, the difference (residual) between the prediction sample and the original sample is not transmitted. In the case of the MVP mode, a motion vector of the current block may be derived using a motion vector of a neighboring block as a motion vector predictor of the current block.

In the case of inter prediction, the neighboring block may include a spatial neighboring block existing in the current picture and a temporal neighboring block existing in a reference picture. The reference picture including the temporal neighboring block may be referred to as a collocated picture (colPic). The motion information may include a motion vector and a reference picture index. Information such as prediction mode information and motion information may be (entropy) encoded and output in the form of a bitstream.

When motion information of a temporal neighboring block is used in the skip mode and the merge mode, the highest picture on a reference picture list may be used as a reference picture. Reference pictures included in the reference picture list may be arranged on the basis of a difference in the picture order count (POC) between the current picture and the reference picture. The POC corresponds to the display order of pictures and may be distinguished from the coding order.

The subtraction unit 121 generates a residual sample, which is a difference between an original sample and the prediction sample. When the skip mode is applied, the residual sample may not be generated as described above.

The transform unit 122 generates a transform coefficient by transforming the residual sample by the unit of transform block. The transform unit 122 may perform transform according to the size of a corresponding transform block and a prediction mode applied to a coding block or a prediction block spatially overlapped with the transform block. For example, when intra prediction is applied to the coding block or the prediction block overlapped with the transform block, and the transform block is a 4×4 residual array, the residual sample is transformed using a Discrete Sine Transform (DST) transform kernel, and in other cases, the residual sample may be transformed using a Discrete Cosine Transform (DST) transform kernel.

The quantization unit 123 may generate quantized transform coefficients by quantizing transform coefficients.

The rearrangement unit 124 rearranges the quantized transform coefficients. The rearrangement unit 124 may rearrange the quantized transform coefficients of a block shape in the form of a one-dimensional vector through a coefficient scanning method. Here, although the rearrangement unit 124 is described as a separate configuration, the rearrangement unit 124 may be a part of the quantization unit 123.

The entropy encoding unit 130 may perform entropy encoding on the quantized transform coefficients. The entropy encoding may include, for example, encoding methods such as exponential Golomb, context-adaptive variable length coding (CAVLC), context-adaptive binary arithmetic coding (CABAC), and the like. The entropy encoding unit 130 may encode information needed for video reconstruction (e.g., a value of a syntax element, etc.) together or separately, in addition to the quantized transform coefficients. The entropy-encoded information may be transmitted or stored in the form of a bitstream by the unit of network abstraction layer (NAL).

The inverse quantization unit 125 performs inverse-quantization on the values quantized by the quantization unit 123 (quantized transform coefficients), and the inverse transform unit 126 generates a residual sample by performing inverse transform on the values inverse-quantized by the inverse quantization unit 125.

The addition unit 140 reconstructs a picture by adding the residual sample and the prediction sample. The residual sample and the prediction sample may be added by the unit of block to generate a reconstructed block. Here, although the addition unit 140 is described as a separate configuration, the addition unit 140 may be a part of the prediction unit 110. Meanwhile, the addition unit 140 may be referred to as a reconstruction unit or a reconstructed block generation unit.

For a reconstructed picture, the filter unit 150 may apply a deblocking filter and/or a sample adaptive offset. Through the deblocking filter and/or the sample adaptive offset, an artifact of a block boundary in the reconstructed picture or distortion in the quantization process may be corrected. The sample adaptive offset may be applied by the unit of sample, and may be applied after the process of deblocking filtering is completed. The filter unit 150 may apply an adaptive loop filter (ALF) to the reconstructed picture. The ALF may be applied to a reconstructed picture after applying the deblocking filter and/or the sample adaptive offset.

The memory 160 may store the reconstructed picture (the decoded picture) or information needed for encoding/decoding. Here, the reconstructed picture may be a reconstructed picture for which a filtering procedure has been completed by the filter unit 150. The stored reconstructed picture may be used as a reference picture for (inter) prediction of other pictures. For example, the memory 160 may store (reference) pictures used for inter prediction. At this point, the pictures used for inter prediction may be specified by a reference picture set or a reference picture list.

Figure 2:
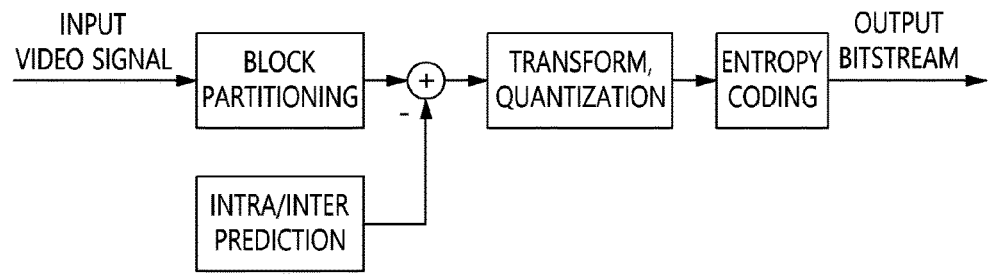
FIG. 2 is a view showing an example of a video encoding method performed by a video encoding device.

FIG. 2 is a view showing an example of a video encoding method performed by a video encoding device. Referring to FIG. 2, the video encoding method may include processes of block partitioning, intra/inter prediction, transform, quantization, and entropy encoding. For example, a current picture may be split into a plurality of blocks, and a prediction block of the current block may be generated through intra/inter prediction, and a residual block of the current block may be generated through subtraction of the input block of the current block and the prediction block. Thereafter, a coefficient block, i.e., transform coefficients of the current block, may be generated through transform of the residual block. The transform coefficients may be quantized, entropy encoded, and stored in a bitstream.

Figure 3:
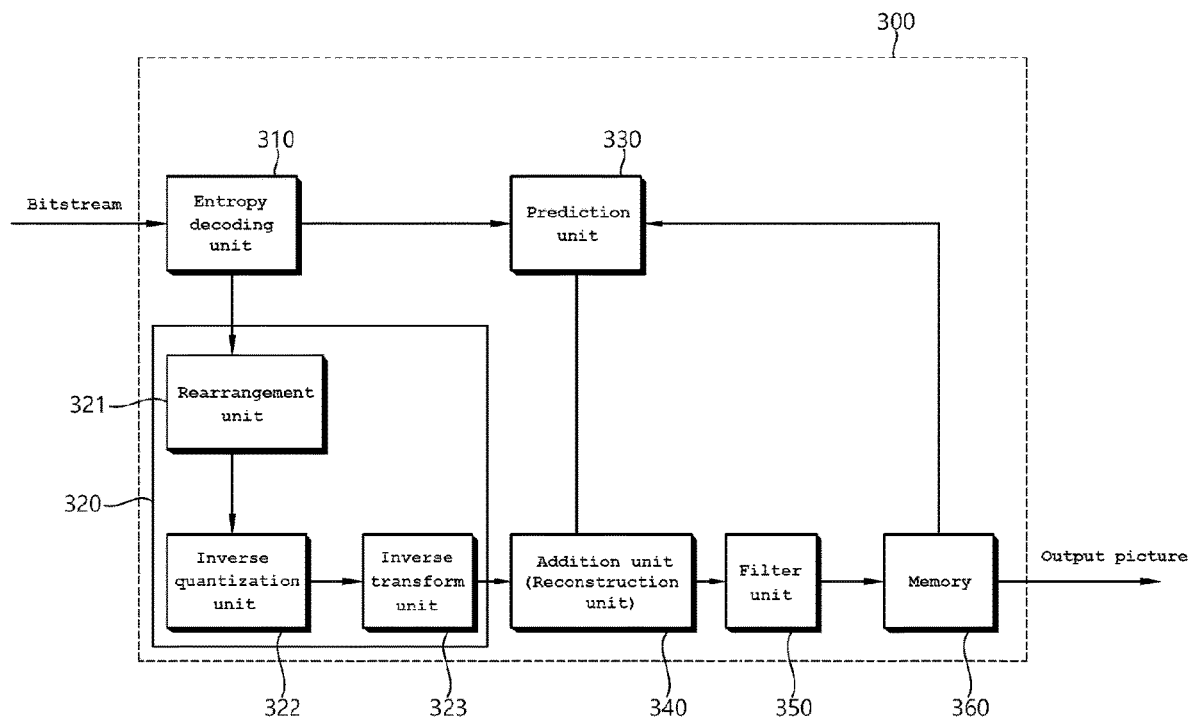
FIG. 3 is a view schematically showing the configuration of a video decoding device to which the present invention may be applied.

FIG. 3 is a view schematically showing the configuration of a video decoding device to which the present invention may be applied.

Referring to FIG. 3, a video decoding device 300 may include an entropy decoding unit 310, a residual processing unit 320, a prediction unit 330, an addition unit 340, a filter unit 350, and a memory 360. Here, the residual processing unit 320 may include a rearrangement unit 321, an inverse quantization unit 322, and an inverse transform unit 323.

When a bitstream including video information is input, the video decoding device 300 may reconstruct a video in response to a process in which video information is processed by the video encoding device.

For example, the video decoding device 300 may perform video decoding using a processing unit applied in the video encoding device. Accordingly, the processing unit block of video decoding may be, for example, a coding unit, and as another example, it may be a coding unit, a prediction unit, or a transform unit. The coding unit may be split from the largest coding unit according to a quad tree structure and/or a binary tree structure.

A prediction unit and a transform unit may be further used in some cases, and in this case, the prediction block is a block derived or partitioned from a coding unit, and may be a unit of sample prediction. At this point, the prediction unit may be split into subblocks. The transform unit may be split from a coding unit according to a quad tree structure, and may be a unit for inducing a transform coefficient or a unit for inducing a residual signal from the transform coefficient.

The entropy decoding unit 310 may parse a bitstream and output information needed for video reconstruction or picture reconstruction. For example, the entropy decoding unit 310 may decode information in a bitstream on the basis of a coding method such as exponential Golomb coding, CAVLC, or CABAC, and output a value of a syntax element needed for video reconstruction, and quantized values of transform coefficients related to the residual.

More specifically, the CABAC entropy decoding method may receive a bin corresponding to each syntax element from a bitstream, determine a context model using syntax element information of a decoding target and decoding information of neighboring and decoding target blocks or using information on the symbol/bin decoded in a previous step, and generate a symbol corresponding to a value of each syntax element by performing arithmetic decoding on the bin after predicting a probability of occurrence of the bin according to the determined context model. At this point, the CABAC entropy decoding method may update the context model by using information on the decoded symbol/bin for the sake of the context model of a next symbol/bin after the context model is determined.

Among the information decoded by the entropy decoding unit 310, information on prediction is provided to the prediction unit 330, and the residual value on which entropy decoding is performed by the entropy decoding unit 310, i.e., the quantized transform coefficient, may be input into the rearrangement unit 321.

The rearrangement unit 321 may rearrange the quantized transform coefficients in the form of a two-dimensional block. The rearrangement unit 321 may perform rearrangement in response to coefficient scanning performed by the encoding device. Here, although the rearrangement unit 321 is described as a separate configuration, the rearrangement unit 321 may be a part of the inverse quantization unit 322.

The inverse quantization unit 322 may inverse quantize the quantized transform coefficients on the basis of (inverse) quantization parameters and output transform coefficients. At this point, information for deriving the quantization parameters may be signaled from the encoding device.

The inverse transform unit 323 may derive residual samples by performing an inverse transform on the transform coefficients.

The prediction unit 330 may perform prediction on the current block and generate a predicted block including prediction samples for the current block. The unit of prediction performed by the prediction unit 330 may be a coding block, a transform block, or a prediction block.

The prediction unit 330 may determine whether to apply intra prediction or inter prediction on the basis of the information on the prediction. At this point, the unit for determining which of the intra prediction and the inter prediction to apply may be different from the unit for generating a prediction sample. In addition, in inter prediction and intra prediction, the units for generating a prediction sample may also be different. For example, whether to apply inter prediction or intra prediction may be determined by the unit of CU. In addition, for example, in inter prediction, a prediction mode may be determined and a prediction sample may be generated by the unit of PU. In intra prediction, a prediction mode may be determined by the unit of PU, and a prediction sample may be generated by the unit of TU.

In the case of intra prediction, the prediction unit 330 may derive a prediction sample for the current block on the basis of neighboring reference samples in the current picture. The prediction unit 330 may derive the prediction sample for the current block by applying a directional mode or a non-directional mode on the basis of the neighboring reference samples of the current block. At this point, a prediction mode to be applied to the current block may be determined by using the intra prediction mode of a neighboring block. Meanwhile, Matrix-based Intra Prediction (MIP) that performs a prediction on the basis of a matrix trained in advance may be used. In this case, the number of MIP modes and the size of a matrix are defined for each block size, and a reference sample is down-sampled to fit the size of the matrix, multiplied by a matrix determined by a mode number, and interpolated to fit the size of the prediction block to generate a prediction value.

In the case of inter prediction, the prediction unit 330 may derive a prediction sample for the current block on the basis of a sample specified on a reference picture by a motion vector on the reference picture. The prediction unit 330 may derive the prediction sample for the current block by applying any one among a skip mode, a merge mode, and an MVP mode. At this point, motion information needed for inter prediction of the current block provided by the video encoding device, such as information on the motion vector, the reference picture index and the like, may be obtained or derived on the basis of information on the prediction.

In the case of the skip mode and the merge mode, motion information of a neighboring block may be used as motion information of the current block. At this point, the neighboring block may include a spatial neighboring block and a temporal neighboring block.

The prediction unit 330 may construct a merge candidate list by using motion information of available neighboring blocks, and may use information indicated by a merge index in the merge candidate list as a motion vector of the current block. The merge index may be signaled from the encoding device. The motion information may include a motion vector and a reference picture. When motion information of a temporal neighboring block is used in the skip mode and the merge mode, the highest picture in the reference picture list may be used as the reference picture.

In the case of the skip mode, the difference (residual) between the prediction sample and the original sample is not transmitted unlike the merge mode.

In the case of the MVP mode, a motion vector of the current block may be derived by using a motion vector of a neighboring block as a motion vector predictor. At this point, the neighboring block may include a spatial neighboring block and a temporal neighboring block.

For example, when the merge mode is applied, the merge candidate list may be generated by using a motion vector of a reconstructed spatial neighboring block and/or a motion vector corresponding to a Col block, which is a temporal neighboring block. In the merge mode, the motion vector of a candidate block selected from the merge candidate list is used as the motion vector of the current block. The information on the prediction may include a merge index indicating a candidate block having an optimal motion vector selected among candidate blocks included in the merge candidate list. At this point, the prediction unit 330 may derive a motion vector of the current block by using the merge index.

As another example, when the Motion Vector Prediction (MVP) mode is applied, a motion vector predictor candidate list may be generated by using a motion vector of a reconstructed spatial neighboring block and/or a motion vector corresponding to a Col block, which is a temporal neighboring block. That is, the motion vector of a reconstructed spatial neighboring block and/or the motion vector corresponding to a Col block, which is a temporal neighboring block, may be used as a motion vector candidate. The information on the prediction may include a prediction motion vector index indicating an optimal motion vector selected among the motion vector candidates included in the list. At this point, the prediction unit 330 may select a prediction motion vector of the current block among the motion vector candidates included in the motion vector candidate list by using the motion vector index. The prediction unit of the encoding device may obtain a motion vector difference (MVD) between the motion vector of the current block and the motion vector predictor, and encode and output the motion vector difference in the form of a bitstream. That is, the MVD may be obtained by subtracting the motion vector predictor from the motion vector of the current block. At this point, the prediction unit 330 may obtain the motion vector difference included in the information on the prediction, and derive the motion vector of the current block through addition of the motion vector difference and the motion vector predictor. The prediction unit may also obtain or derive a reference picture index or the like indicating the reference picture from the information on the prediction.

The addition unit 340 may reconstruct the current block or the current picture by adding the residual sample and the prediction sample. The addition unit 340 may reconstruct the current picture by adding the residual sample and the prediction sample by the unit of block. When the skip mode is applied, as the residual is not transmitted, the prediction sample may become a reconstructed sample. Here, although the addition unit 340 is described as a separate configuration, the addition unit 340 may be a part of the prediction unit 330. Meanwhile, the addition unit 340 may be referred to as a reconstruction unit or a reconstructed block generation unit.

The filter unit 350 may apply a deblocking filtering sample adaptive offset and/or an ALF to the reconstructed picture. At this point, the sample adaptive offset may be applied by the unit of sample, and may be applied after deblocking filtering. The ALF may be applied after deblocking filtering and/or sample adaptive offset.

The memory 360 may store the reconstructed picture (decoded picture) or information needed for decoding. Here, the reconstructed picture may be a reconstructed picture for which a filtering procedure has been completed by the filter unit 350. For example, the memory 360 may store pictures used for inter prediction. At this point, the pictures used for inter prediction may be specified by a reference picture set or a reference picture list. The reconstructed picture may be used as a reference picture for another picture. In addition, the memory 360 may output reconstructed pictures in an output order.

Figure 4:
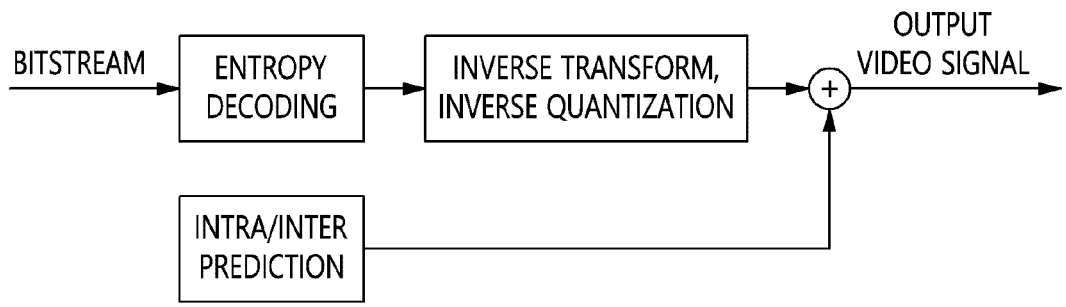
FIG. 4 is a view showing an example of a video decoding method performed by a video decoding device.

FIG. 4 is a view showing an example of a video decoding method performed by a video decoding device. Referring to FIG. 4, the video decoding method may include the processes of entropy decoding, inverse quantization, inverse transform, and intra/inter prediction. For example, an inverse process of the encoding method may be performed in the decoding device. Specifically, quantized transform coefficients may be obtained through entropy decoding of a bitstream, and a coefficient block of the current block, i.e., transform coefficients, may be obtained through an inverse quantization process on the quantized transform coefficients. A residual block of the current block may be derived through inverse transform of the transform coefficients, and a reconstructed block of the current block may be derived through addition of the prediction block of the current block derived through intra/inter prediction and the residual block.

Meanwhile, operators in the embodiments described below may be defined as shown in the following table.

TABLE 1

| | |
|---|---|
| Floor(x) | the largest integer less than or equal to x. |
| Log2(u) | the base-2 logarithm of u. |
| Ceil(x) | the smallest integer greater than or equal to x. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |
| > | greater than. |
| >= | greater than or equal to. |
| < | less than. |
| <= | less than or equal to. |
| == | equal to. |
| != | not equal to. |

Referring to Table 1, Floor(x) may represent a maximum integer value smaller than or equal to x, Log 2(u) may represent a logarithmic value with 2 of u as the base, and Ceil(x) may represent a minimum integer value larger than or equal to x. For example, in the case of Floor(5.93), since the maximum integer value smaller than or equal to 5.93 is 5, it may represent 5.

In addition, referring to Table 1, x>>y may represent an operator that shifts x to the right y times, and x<<y may represent an operator that shifts x to the left y times.

Introduction

The HEVC standard generally uses a discrete cosine transform (DCT), which is a transform type. Accordingly, a separate process of determining a transform type and information on the determined transform type do not need to be transmitted. However, when the current luma block size is 4×4 and intra prediction is performed, a discrete sine transform (DST) transform type is exceptionally used.

Information indicating the position of a nonzero coefficient among the quantized coefficients that have gone through a transform and quantization process may be roughly classified into three types.

1. Position (x,y) of last significant coefficient: The position of the last nonzero coefficient in the scan order within an encoding target block (hereinafter, defined as the last position)
2. Coded subblock flag: A flag indicating whether each subblock contains one or more nonzero coefficients when an encoding target block is split into a plurality of subblocks (or a flag indicating whether it is all zero coefficients)
3. Significant coefficient flag: A flag indicating whether each coefficient in one subblock is nonzero or zero Here, the position of the last significant coefficient is expressed as an x-axis component and a y-axis component, and each component is divided into a prefix and a suffix. That is, the syntax indicating nonzero positions of quantized coefficients includes a total of six syntaxes shown below:
1. last_sig_coeff_x_prefix
2. last_sig_coeff_y_prefix
3. last_sig_coeff_x_suffix
4. last_sig_coeff_y_suffix
5. coded_sub_block_flag
6. sig_coeff_flag Last_sig_coeff_x_prefix indicates the prefix of the x-axis component indicating the position of the last significant coefficient, and last_sig_coeff_y_prefix indicates the prefix of the y-axis component indicating the position of the last significant coefficient. In addition, last_sig_coeff_x_suffix indicates the suffix of the x-axis component indicating the position of the last significant coefficient, and last_sig_coeff_y_suffix indicates the suffix of the y-axis component indicating the position of the last significant coefficient.

Meanwhile, coded_sub_block_flag has a value of '0' when all the coefficients in a corresponding subblock are zero, and '1' when there exist one or more nonzero coefficients. Sig_coeff_flag has a value of '0' in the case of zero coefficient, and '1' in the case of nonzero coefficient. A coded_sub_block_flag syntax is transmitted only for the subblocks that exist before in the scan order in consideration of the position of the last significant coefficient in a coding target block. When coded_sub_block_flag is '1', i.e., when one or more nonzero coefficients exist, syntax sig_coeff_flag is transmitted for each coefficient in a corresponding subblock.

The HEVC standard supports the following three types of scans for coefficients.
1) up-right diagonal
2) horizontal
3) vertical When an encoding target block is encoded using an inter prediction method, coefficients of the corresponding block are scanned in the up-right diagonal method, and when the block is encoded using an intra prediction method, coefficients of the corresponding block are scanned by selecting one among the three types according to the intra prediction mode.

That is, when an inter prediction method is used in the case where an encoding target block is encoded by a video encoding device, coefficients of the corresponding block are scanned in the up-right diagonal method, and when an intra prediction method is used to encode the encoding target block, the video encoding device scans coefficients of the corresponding block by selecting one among the three types according to the intra prediction mode. The scanning may be performed by the rearrangement unit 124 in the video encoding device of FIG. 1, and coefficients of two-dimensional block form may be changed into coefficients of one-dimensional vector form through the scanning.

Figure 5:
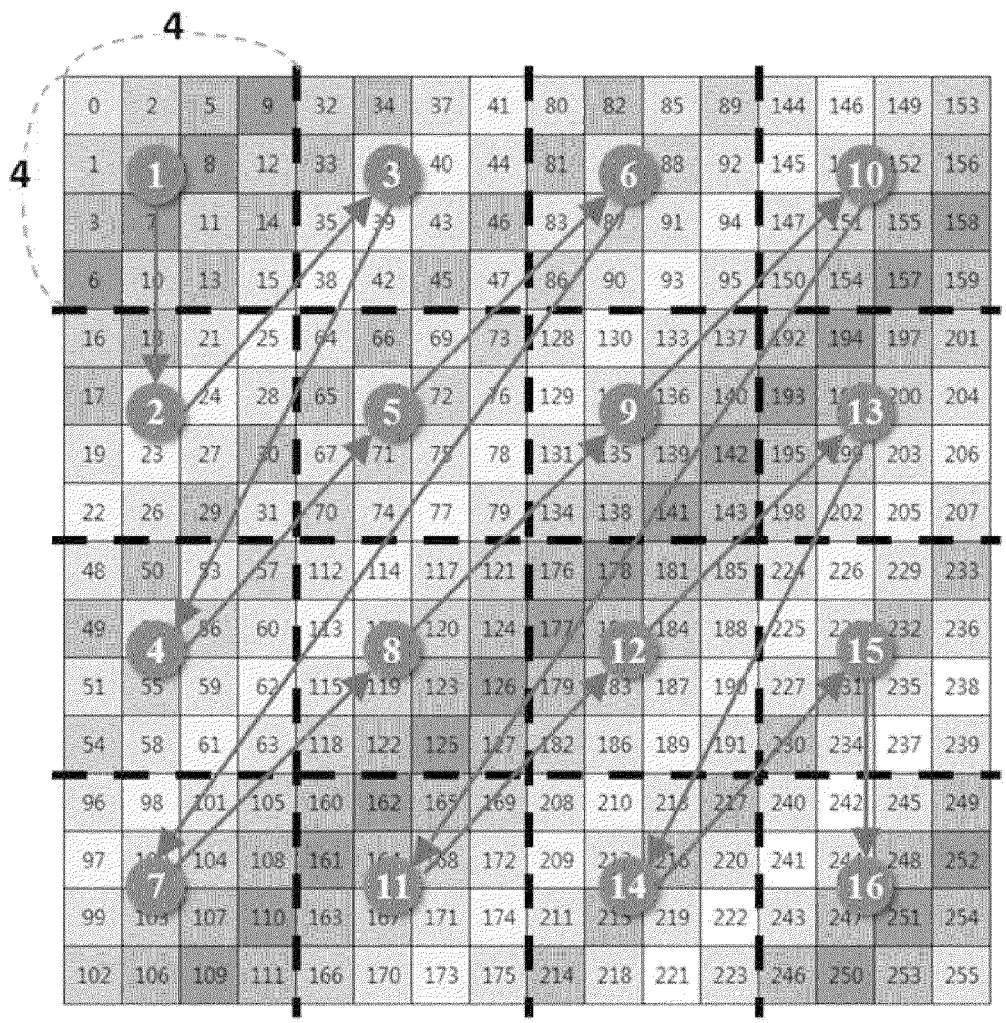
FIG. 5 is a view showing an order of scanning subblocks and coefficients in a diagonal scanning method.

FIG. 5 is a view showing an order of scanning subblocks and coefficients in a diagonal scanning method.

Referring to FIG. 5, when the block of FIG. 5 is scanned in the diagonal scanning method by the rearrangement unit 124 of the video encoding device, scanning is performed starting from subblock 1, which is the upper-leftmost subblock, toward the down and then in the diagonal upper direction, and the scan is finally performed for the lower-right subblock 16. That is, the rearrangement unit 124 rearranges the quantized transform coefficients of a two-dimensional block form into a one-dimensional vector form by performing the scan in order of subblocks 1, 2, 3, . . . , 14, 15, and 16. In the same manner, the rearrangement unit 124 of the video encoding device scans coefficients in each subblock in the diagonal scanning method the same as that of subblocks. For example, in subblock 1, the rearrangement unit 124 performs scanning in order of coefficients 0, 1, 2, . . . , 13, 14, and 15.

Figure 10:
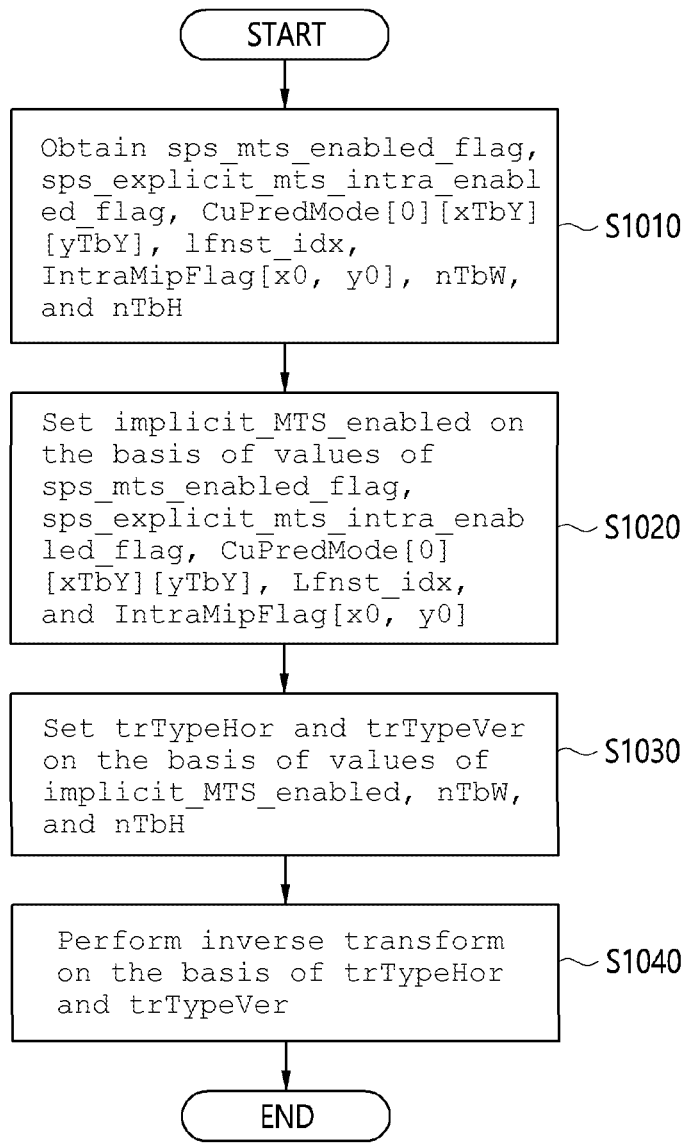
FIG. 10 is a flowchart illustrating a method of performing an inverse transform on the basis of parameters related transform according to an embodiment of the present invention.

However, when the scanned coefficients are stored in a bitstream, the coefficients are stored in a reverse order of the scan. That is, when the block of FIG. 10 is scanned by the rearrangement unit 124 of the video encoding device, scanning is performed in an order starting from the 0th coefficient to the 255th coefficient, but the pixels are stored in the bitstream in an order starting from the pixel at the 255th position to the pixel at the 0th position.

Figure 6:
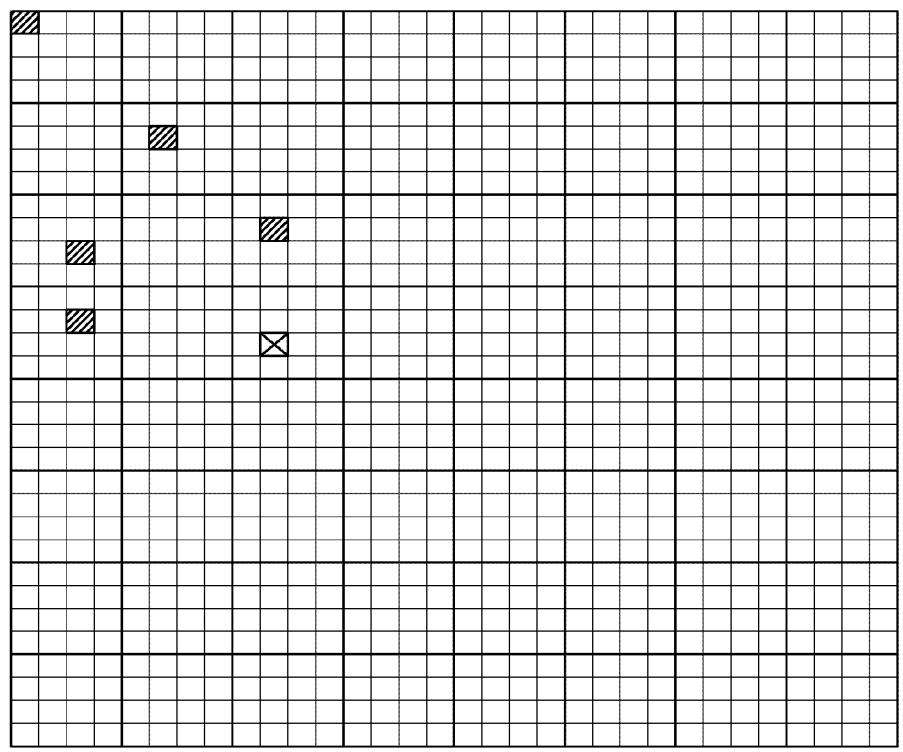
FIG. 6 is a view showing an example of 32×32 encoding target block after quantization.

FIG. 6 is a view showing an example of 32×32 encoding target block after the block is quantized by the video encoding device. Here, when the 32×32 block shown in FIG. 6 is scanned by the video encoding device, a diagonal method is arbitrarily used. In FIG. 6, the pixels marked with oblique lines indicates nonzero coefficients, and the pixel marked with x indicates a last significant coefficient. All the other white coefficients have a value of zero. Here, when syntax coded_sub_block_flag is substituted into the block of FIG. 6, required is information on coded_sub_block_flag of the 24 subblocks existing before the last position in the scan order among a total of 64 subblocks, i.e., subblocks indicated by bold lines. The values of coded_sub_block_flag for the first subblock including the DC value and the 24th subblock including the last position coefficient among the 24 subblocks are derived as '1', and the value of coded_sub_block_flag for the other 22 subblocks are transmitted to the video decoding device through a bitstream. At this point, in the case of a subblock including one or more nonzero coefficients among the 22 subblocks, the value of coded_sub_block_flag is set to '1' by the video decoding device. In FIG. 6, the values of coded_sub_block_flag of the 4th, 5th, 11th, and 18th subblocks, which are subblocks including pixels marked in gray color among the 22 subblocks excluding the first subblock and the 24th subblock, are set to '1'.

1. Method of Determining Primary Transform Type of Decoding Target Block

This specification discloses a method of determining a primary transform type of a decoding target block in the process of decoding a video. That is, when a decoding target block is decoded by a video decoding device, a process of determining in which transform type the block is primarily transformed when the block is encoded in the process of transforming by the video encoding device is required. A primary transform type is configured of one default transform and a plurality of extra transforms. The decoding target block uses a default transform or a multiple transform set (MTS) including a default transform and extra transforms according to a condition. That is, a decoding target block may be transformed using only a default transform or using a multiple transform set including a default transform and extra transforms in a transform process. On the contrary, from the viewpoint of the video decoding device, decoding may be performed by grasping whether a decoding target block has been transformed using only a default transform or a multiple transform set (MTS) including a default transform and extra transforms. When the decoding target block uses an MTS, information on an actually used transform among a plurality of transforms is transmitted or derived. Here, in the information on an actually used transform, a horizontal axis transform type and a vertical axis transform type may exist separately. That is, when a decoding target block is transformed using an MTS, the video decoding device may perform decoding after receiving or determining a transform type that is used to transform the block among a plurality of transform types.

According to an embodiment, DCT-II may be set as the default transform, and DST-7 and DCT-8 may be set as the extra transforms. At this point, the maximum size of DCT-II, which is a default transform, is supported up to 64×64, and the maximum size of DST-7 and DCT-8, which are extra transforms, is supported up to 32×32. For example, when the size of a decoding target block is 64×64, one 64×64 DCT-II is applied in the transform process. That is, when one or more among the width and the height of the decoding target block is greater than 32 (exceeds 32), a default transform (*) is directly applied without applying an MTS. That is, from the viewpoint of the video decoding device, it only needs to determine whether the block is transformed using an MTS only when both the horizontal and vertical sizes of the decoding target block are 32 or less. On the contrary, when one among the horizontal and vertical sizes of the decoding target block is greater than 32, it may be determined that the block is transformed by applying a default transform. As described above, when a decoding target block is transformed using a default transform, there is no syntax information transmitted in relation to the MTS. In the present invention, although the value of the transform type of DCT-II is set to '0', the value of the transform type of DST-7 is set to '1', and the value of the transform type of DCT-8 is set to '2' for convenience, it is not limited thereto. Table 2 shown below defines a transform type assigned to each value of the trType syntax.

TABLE 2

| trType | Transform types |
| --- | --- |
| 0 | DCT-II |
| 1 | DST-7 |
| 2 | DCT-8 |

Tables 3 and 4 show examples of transform kernels of DST-7 and DST-8 when the size of a decoding target block is 4×4.

Table 3 shows coefficient values of a corresponding transform kernel when tyType is '1' (DST-7) and the size of a decoding target block is 4×4, and Table 4 shows coefficient values of a corresponding transform kernel when tyType is '2' (DCT-8) and the size of a decoding target block is 4×4.

TABLE 3

| Transform type | DST-7, 4 × 4 |
| --- | --- |
| Transform kernel | transMatric[m][n] = {{29 55 74 84} {74 74 0 −74} {84 −29 −74 55} {55 −84 74 −29}} |

TABLE 4

| Transform type | DST-8, 4 × 4 |
| --- | --- |
| Transform kernel | transMatric[m][n] = {{84 74 55 29} {74 0 −74 −74} {55 −74 −29 84} {29 −74 84 −55}} |

A zero-out area may be included in the entire transform area of a decoding target block. Values of pixel domain are transformed into values of frequency domain, and at this point, the upper-left frequency area is referred to as a low frequency area, and the lower-right frequency area is referred to as a high frequency area. A low frequency component reflects general (average) characteristics of a corresponding block, and a high frequency component reflects sharp (peculiar) characteristics of a corresponding block. Therefore, the low frequency component incudes a plurality of large values, and the high frequency component incudes a few small values. Through the quantization process after a transform, most of the few small values in the high frequency area are changed to a zero value. Here, most of the areas having a zero value, other than the low frequency area belonging to the upper-left area, are referred to as a zero-out area, and the zero-out area may be excluded in the signaling process. The area excluding the zero-out areas in a decoding target block is referred to as a valid area.

Figure 7:
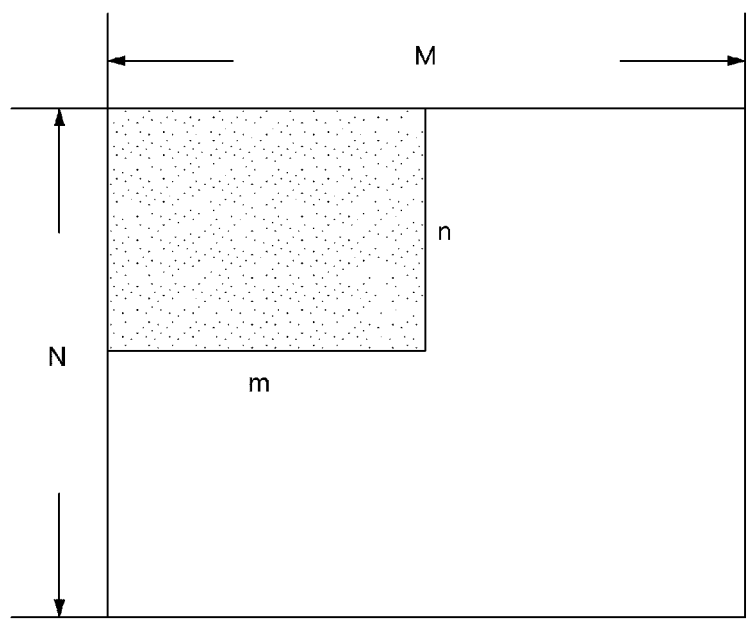
FIG. 7 is a view showing the zero-out area other than the m×n area in the area of an M×N decoding target block.

FIG. 7 is a view showing the zero-out area other than the m×n area in the area of an M×N decoding target block.

Referring to FIG. 7, the upper-left gray area represents a low frequency area, and the white area represents a zero-out area of high frequency.

As another example, when a decoding target block is 64×64, the upper-left 32×32 area becomes a valid area, and the area other than this area becomes a zero-out area, so that signaling is not performed.

In addition, when the size of a decoding target block is one among 64×64, 64×32, and 32×64, the upper-left 32×32 area becomes a valid area, and the area other than this area becomes a zero-out area, and since the decoder knows the block size when parsing the syntax for the quantized coefficients, the zero-out area is not signaled. That is, an area of which the width or the height of the decoding target block is greater than 32 is set as a zero-out area. At this point, since it corresponds to a case where the horizontal or vertical size of the decoding target block is greater than 32, the transform that is used is DCT-II, which is a default transform. Since the maximum size of DST-7 and DCT-8, which are extra transforms, is supported up to 32×32, the MTS is not applied to target blocks of this size.

In addition, when the size of the decoding target block is one among 32×32, 32×16, and 16×32 and an MTS is applied to the decoding target block (e.g., when DST-7 or DCT-8 is used), the upper-left 16×16 area becomes a valid area, and the area other than this area is set as a zero-out area. Here, the zero-out area may be signaled according to the location of the last significant coefficient and a scanning method. This is since that as the encoder signals an MTS index (mts_idx) value after signaling of syntaxes related to the quantized coefficients is finished, information on the transform type is unknown when the decoder parses the syntaxes for the quantized coefficients. When the zero-out area is signaled as described above, the decoder may perform transform only on valid areas after ignoring or removing the quantized coefficients corresponding to the zero-out area. Here, in the information on an actually used transform type, a horizontal axis transform type and a vertical axis transform type may exist separately. For example, when the horizontal axis transform type of the decoding target block is DST-7 or DCT-8, the horizontal axis (width) valid area of the decoding target block becomes 16, and when the vertical axis transform type of the decoding target block is DST-7 or DCT-8, the vertical axis (height) valid area of the decoding target block becomes 16.

On the contrary, when the size of the decoding target block is one among 32×32, 32×16, and 16×32 and an MTS is not applied to the decoding target block (e.g., when DCT-II, which is a default transform, is used), all the areas are valid areas, and therefore, there is no zero-out area, and the transform is performed using DCT-II, which is a default transform. Here, in the information on an actually used transform type, a horizontal axis transform type and a vertical axis transform type may exist separately. For example, when the horizontal axis transform type of the decoding target block is DCT-II, the horizontal axis (width) valid area of the decoding target block becomes the width of the corresponding block, and when the vertical axis transform type of the decoding target block is DCT-II, the vertical axis (height) valid area of the decoding target block becomes the height of the corresponding block. That is, all the areas (width×height) of the decoding target block become valid areas.

On the other hand, when the decoding target block has a size smaller than 16, which is not defined above, all the areas become valid areas, and there is no zero-out area. Whether an MTS is applied to the decoding target block and the transform type value are determined by an implicit and/or explicit embodiment.

In the present invention, details of the syntax for expressing the position of a nonzero coefficient among the quantized coefficients that have gone through a transform and quantization process are the same as those of the HEVC method. However, syntax name coded_sub_block_flag changed to sb_coded_flag is used. In addition, the method of scanning the quantized coefficients uses an up-right diagonal method.

In the present invention, an MTS may be applied to a luma block (not applied to a chroma block). In addition, an MTS function may be turned on and off using a flag indicating whether an MTS is used, i.e., sps_mts_enabled_flag. When an MTS function is used, sps_mts_enabled_flag=on is set, and whether an MTS function is used may be explicitly set for each of intra prediction and inter prediction. That is, flag sps_explicit_mts_intra_enabled_flag indicating whether an MTS is used in intra prediction and flag sps_explicit_mts_inter_enabled_flag indicating whether an MTS is used in inter prediction may be separately set. Although it is described in this specification for convenience that the values of three flags sps_mts_enabled_flag, sps_explicit_mts_intra_enabled_flag, and sps_explicit_mts_inter_enabled_flag indicating whether an MTS is used are located in a sequence parameter set (SPS), it is not limited thereto. That is, each of the three flags may be set at one or more positions among the decoding capability information (DCI), the video parameter set (VPS), the sequence parameter set (SPS), the picture parameter set (PPS), the picture header (PH), and the slice header (SH). In addition, the flags indicating whether the three MTSs are used may be defined as high-level syntax (HLS).

Using an MTS may be divided into an explicit method and an implicit method. In the method of explicitly using an MTS, when a flag value indicating whether an MTS is used within a screen and/or between screens is set to 'on' in the SPS and a specific condition is satisfied, MTS-related information (e.g., actually used transform information) is transmitted. That is, the video decoding device may receive MTS-related information and confirm which transform type is used to transform the decoding target block on the basis of the received MTS-related information, and may perform decoding on the basis of the transform type. For example, in an environment in which an explicit MTS is used, the three flags described above may be set as follows.

1. sps_mts_enabled_flag=on
 2. sps_explicit_mts_intra_enabled_flag=on
 3. sps_explicit_mts_inter_enabled_flag=on In the method of implicitly using an MTS, when the value of sps_mts_enabled_flag among the three flags is set to 'on' in the SPS and a specific condition is satisfied, MTS-related information (e.g., actually used transform information) is derived. For example, in an environment in which an implicit MTS is used, the three flags described above may be set as follows.

1. sps_mts_enabled_flag=on
2. sps_explicit_mts_intra_enabled_flag=off
3. sps_explicit_mts_inter_enabled_flag=off (on or off is irrelevant)

Hereinafter, an implicit MTS method and an explicit MTS method will be described through several embodiments.

2. First Embodiment (Implicit MTS)

The implicit MTS described in this embodiment may be used when a decoding target block is encoded in an intra prediction method. That is, when a decoding target block is encoded by the video encoding device in an intra prediction method, encoding and/or decoding may be performed by the video encoding device and/or the video decoding device using an implicit MTS. On the other hand, whether an implicit MTS will be used when a decoding target block is decoded may be indicated by parameter implicitMtsEnabled. The video decoding device may determine whether or not to perform decoding using an implicit MTS by confirming the value of parameter implicitMtsEnabled. For example, when an implicit MTS is used for decoding, parameter implicitMtsEnable may have a value of 1, otherwise, parameter implicitMtsEnable may have a value of 0. Meanwhile, in this specification, implicitMtsEnabled may be expressed as 'implicit_MTS_enabled' in some cases.

Describing the conditions of high-level syntax (HLS) for applying an implicit MTS, since sps_mts_enabled_flag is a flag indicating whether an MTS is applied regardless of whether it is implicit or explicit, it should be set to 'on' to apply an implicit MTS. Meanwhile, an implicit MTS is used when a decoding target block is encoded by the video encoding device in an intra prediction method. Accordingly, the video decoding device may determine whether or not to use the implicit MTS by confirming the value of sps_explicit_mts_intra_enabled_flag. However, sps_explicit_mts_intra_enabled_flag is set to 'on' when a decoding target block is encoded by the video encoding device in an intra prediction method and an explicit MTS is applied. Accordingly, when a decoding target block is encoded by the video encoding device using an implicit MTS, sps_explicit_mts_intra_enabled_flag is set to 'off'. Meanwhile, as described above, the implicit MTS is used when a decoding target block is encoded by the video encoding device in an intra prediction method. Accordingly, the value of sps_explicit_mts_inter_enabled_flag indicating an explicit MTS when a decoding target block is encoded by the video encoding device in an intra prediction method is not important. Meanwhile, since the implicit MTS may be used when a decoding target block is encoded by the video encoding device in an intra prediction method, it can be applied when CuPredMode has a value of MODE_INTRA.

In summary, the conditions for a decoding target block to be decoded using an implicit MTS by the video decoding device may be listed as follows.

1) sps_mts_enabled_flag is equal to 1
2) sps_explicit_mts_intra_enabled_flag is equal to 0
3) CuPredMode is equal to MODE_INTRA (intra prediction method)

Meanwhile, CuPredMode[0][xTbY][yTbY] indicating the prediction mode of the current position in a luma block may have a value of MODE_INTRA.

Additional conditions capable of using an implicit MTS are as follows.

4) lfnst_idx is equal to 0
5) intra_mip_flag is equal to 0

Here, the value of lfnst_idx indicates a secondary transform, and when lfnst_idx=0, it means that the secondary transform is not used. The value of intra_mip_flag indicates whether a prediction method using a matrix (matrix-based intra prediction: mip), which is one of intra prediction methods, is used. When intra_mip_flag=0, it means that a prediction using a matrix is not used, and when intra_mip_flag=1, it means that a prediction using a matrix is used.

That is, this embodiment describes a method of setting a primary transform type (or MTS) for a decoding target block that does not use a secondary transform while predicting in a general intra prediction method. When all the five conditions described above are satisfied, the implicit MTS function may be activated (see FIG. 13).

Figure 8:
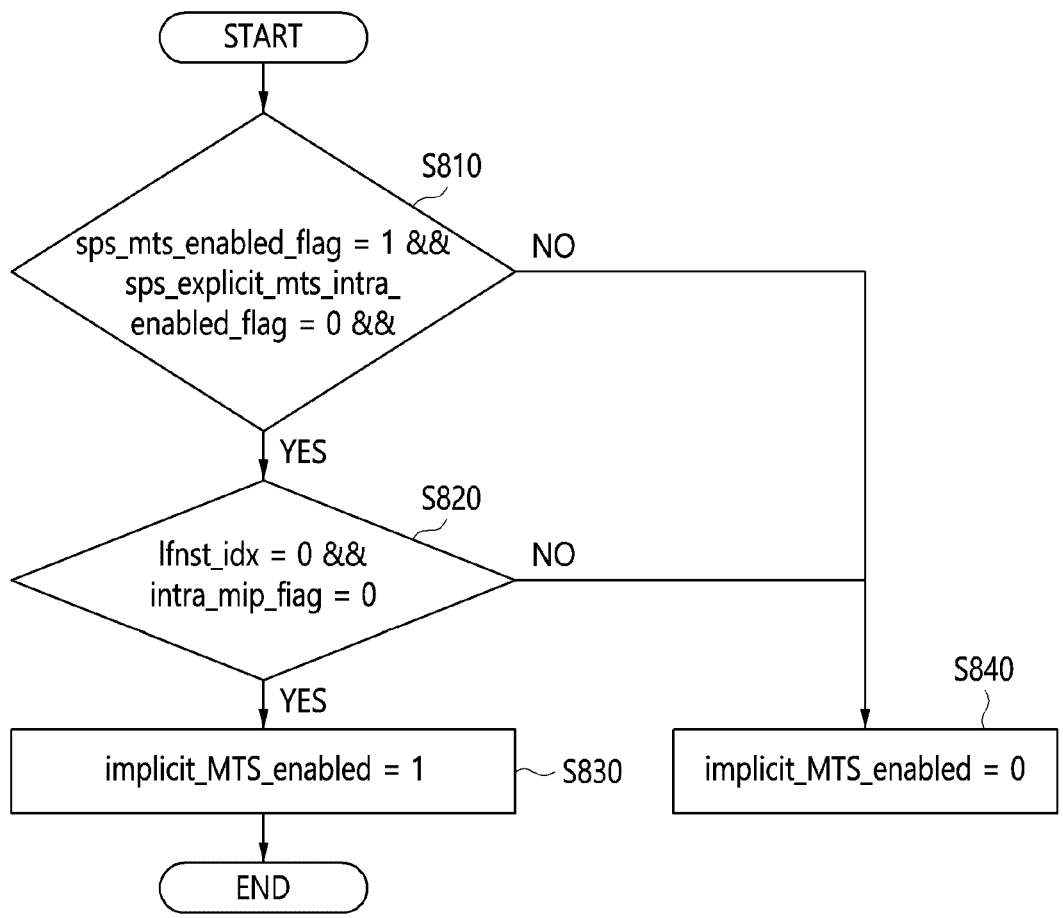
FIG. 8 is a flowchart illustrating a method of determining whether or not to apply an implicit MTS function according to an embodiment of the present invention.

FIG. 8 is a flowchart illustrating a method of determining whether or not to apply an implicit MTS function according to an embodiment of the present invention. Each of the steps in FIG. 8 may be performed in the video decoding device.

Referring to FIG. 8, the video decoding device determines whether sps_mts_enable_flag has a value of 1, sps_explicit_mts_intra_enable_flag has a value of 0, and CuPredMode has a value of MODE_INTRA (S810). When all the conditions of S810 are satisfied as a result of the determination, the video decoding device determines whether lfnst_idx has a value of 0 and intra_mip_flag has a value of 0 (S820), and sets the value of implicit_MTS_enabled to 1 when both the conditions of S810 and S820 are satisfied (S830). Meanwhile, the video decoding device sets the value of implicit_MTS_enabled to 0 when any one of the conditions of S810 and S820 is not satisfied (S840).

Figure 9:
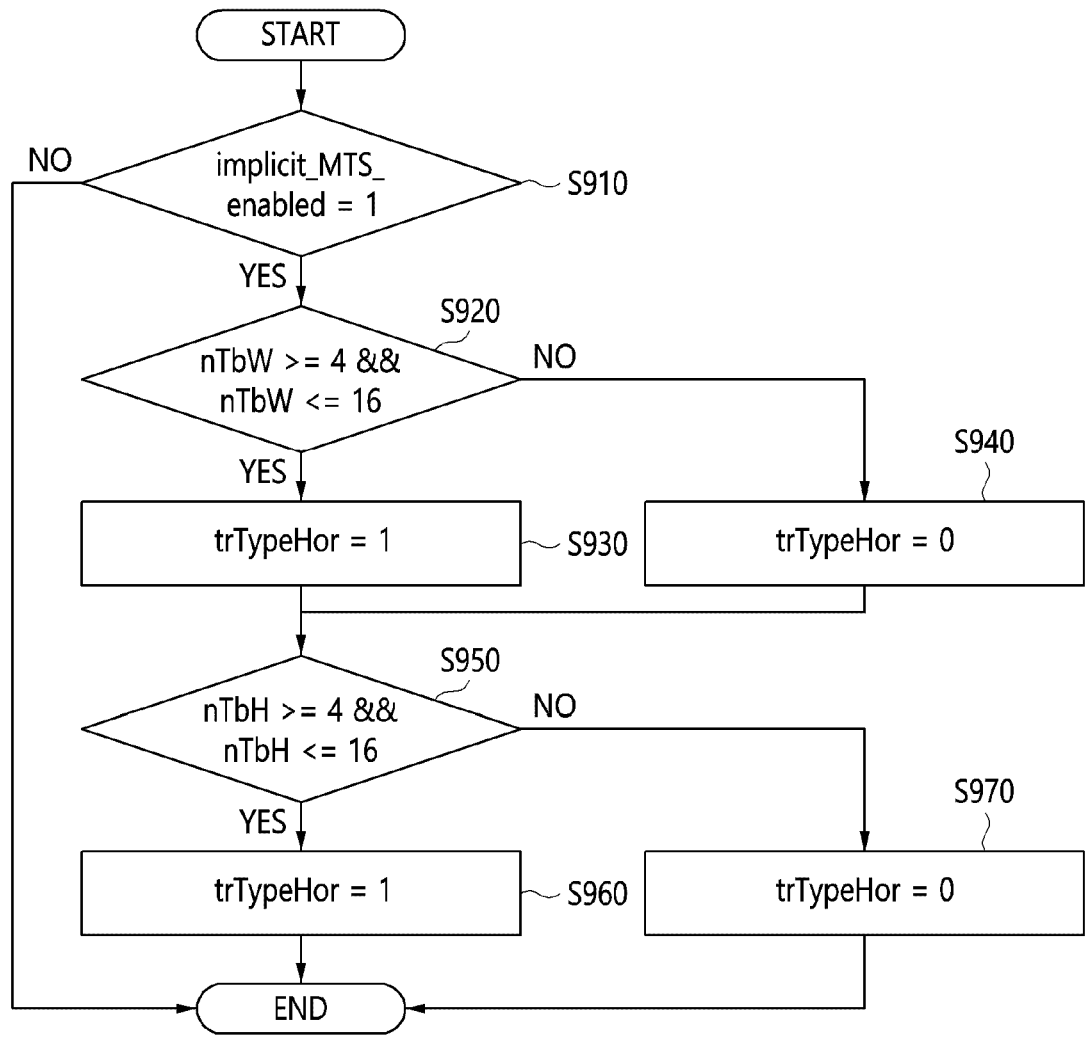
FIG. 9 is a flowchart illustrating a method of deriving transform information on the basis of the width and height of a corresponding block of an implicit MTS according to an embodiment of the present invention.

When the implicit MTS function is activated (implicit_MTS_enabled=on) for a decoding target block, an MTS value (actually used transform information) is derived on the basis of the width and height of the corresponding block (see FIG. 9). At this point, the transform should not be a subblock transform (sbt) in which only a part of the target block goes through the transform process. That is, the value of cu_sbt_flag of the target block is '0'.

FIG. 9 is a flowchart illustrating a method of deriving transform information on the basis of the width and height of a corresponding block of an implicit MTS according to an embodiment of the present invention. Each of the steps in FIG. 9 may be performed in the video decoding device.

Referring to FIG. 9, the video decoding device determines whether the value of implicit_MTS_enabled is '1' (S910). At this point, although not shown in the drawing, the video decoding device may additionally confirm whether cu_sbt_flag has a value of '0'. At this point, when cu_sbt_flag has a value of '1', it indicates that the decoding target block is transformed by a subblock transform in which only a part of the target block goes through a transform process. On the contrary, when cu_sbt_flag has a value of '0', it indicates that the decoding target block is not transformed by a subblock transform in which only a part of the object block goes through a transform process. Accordingly, the operations according to FIG. 14 may be set to operate only when cu_sbt_flag has a value of '0'.

When the value of implicit MT S enabled is '1', it is determined whether nTbW has a value between 4 and 16 (S920), and when the value of implicit_MTS_enabled is not '1', the operation is terminated. nTbW is the width of a corresponding transform block, and is used to determine whether DST-7, which is an extra transform type, can be used in the horizontal axis direction.

When nTbW has a value between 4 and 16 as a result of the determination at step S920, trTypeHor is set to '1' (S930), and when nTbW does not have a value between 4 and 16, trTypeHor is set to '0' (S940). At this point, nTbW is the width of a corresponding transform block, and is used to determine whether DST-7, which is an extra transform type, can be used in the horizontal axis direction. At this point, when tyTypeHor is set to '0', it may be determined that the corresponding transform block is transformed using a DCT-II transform, which is a default type transform, in the horizontal axis direction. On the other hand, when trType-Hor is set to '1', it may be determined that the corresponding transform block is transformed using a DST-7 transform, which is one of the extra transform types, in the horizontal axis direction.

In addition, the video decoding device determines whether nTbH has a value between 4 and 16 (S950), and sets trTypeVer to '1' when nTbH has a value between 4 and 16 (S960), and sets trTypeVer to '0' when nTbW does not have a value between 4 and 16 (S970). nTbH is the height of a corresponding transform block, and is used to determine whether DST-7, which is an extra transform type, can be used in the vertical direction. At this point, when trTypeVer is set to '0', it may be determined that a corresponding transform block is transformed using a DCT-II transform, which is a default type transform, in the vertical axis direction. On the other hand, when trTypeVer is set to '1', it may be determined that the corresponding transform block is transformed using a DST-7 transform, which is one of the extra transform types, in the vertical axis direction.

FIG. 10 is a flowchart illustrating a method of performing an inverse transform on the basis of parameters related transform according to an embodiment of the present invention. Each of the steps in FIG. 10 may be performed in the video decoding device and, for example, may be performed by the inverse transform unit of the video decoding device.

Referring to FIG. 10, the video decoding device obtains sps_mts_enabled_flag, sps_explicit_mts_intra_enabled_flag, CuPredMode [0] [xTbY][yTbY], lfnst_idx, IntraMipFlag[x0, y0], nTbW, and nTbH (S1010). At this point, what each of sps_mts_enabled_flag, sps_explicit_mts_intra_enabled_flag, CuPredMode[0][xTbY][yTbY], lfnst_idx, and IntraMipFlag[x0, y0] represents is described in detail in the related description of FIG. 8, and the parameters are used to determine whether the decoding target block may apply an implicit MTS. In addition, nTbW and nTbH respectively indicate the width and the height of a corresponding transform block, and are used to determine whether DST-7, which is an extra transform type, can be used.

Next, the video decoding device sets implicit_MTS_enabled on the basis of the values of sps_mts_enabled_flag, sps_explicit_mts_intra_enabled_flag, CuPredMode[0] [xTbY][yTbY], Lfnst_idx, and IntraMipFlag[x0, y0] (S1020). At this point, implicit_MTS_enable may be set by performing the process of FIG. 13.

Next, the video decoding device sets trTypeHor and trTypeVer on the basis of the values of implicit_MTS_enabled, nTbW, and nTbH (S1030). At this point, trTypeHor and trTypeVer may be set by performing the process of FIG. 9.

Next, the video decoding device performs an inverse transform on the basis of trTypeHor and trTypeVer (S1040). The inverse transform applied according to trTypeHor and trTypeVer may be configured according to Table 2. For example, when trTypeHor is '1' and trTypeVer is '0', DST-7 may be applied in the horizontal axis direction, and DST-II may be applied in the vertical direction.

Meanwhile, although not shown in the drawing, sps_mts_enabled_flag, sps_explicit_mts_intra_enabled_flag, CuPredMode[0] [xTbY] [yTbY], lfnst_idx, IntraMipFlag [x0, y0], nTbW, and nTbH may be set in order to set whether an implicit MTS is used from the viewpoint of the video encoding device.

3. Second Embodiment (Explicit MTS)

This embodiment describes a transform method applied to a decoding target block when an MTS function is explicitly activated in high-level syntax (HLS). Describing the conditions of high-level syntax (HLS) for applying an explicit MTS, since sps_mts_enabled_flag is a flag indicating whether an MTS is applied regardless of whether it is implicit or explicit, it should be set to 'on' to apply an implicit MTS. Meanwhile, since an explicit MTS may be applied to both a case of encoding a decoding target block in an intra prediction method and a case of encoding a decoding target block in an inter prediction method, both sps_explicit_mts_intra_enabled_flag and sps_explicit_mts_intra_enabled_flag are set to 'on' when the explicit MTS is applied. In summary, the conditions may be listed as follows.

1) sps_mts_enabled_flag=on
2) sps_explicit_mts_intra_enabled_flag=on
3) sps_explicit_mts_inter_enabled_flag=on Here, when a decoding target block is encoded in an intra prediction method, the condition of sps_explicit_mts_intra_enabled_flag="on" is confirmed, and when a decoding target block is encoded in an inter prediction method, the condition of sps_explicit_mts_inter_enabled_flag="on" is confirmed.

Additional conditions capable of using an explicit MTS are as follows.

4) lfnst_idx is equal to 0 (see implicit MTS)
5) transform_skip_flag is equal to 0
6) intra_subpartitions_mode_flag is equal to 0
7) cu_sbt_flag is equal to 0 (see implicit MTS)
8) Valid MTS area
9) The width and height of a target block is 32 or less Here, the value of lfnst_idx indicates a secondary transform, and when lfnst_idx=0, it means that the secondary transform is not used.

The value of transform_skip_flag indicates that the transform process is omitted, and when transform_skip_flag=0, it indicates that the transform is normally performed without omitting the transform process. The value of intra_subpartitions_mode_flag indicates that a target block is divided into a plurality of subblocks and goes through a process of prediction, transform, and quantization as one of intra prediction methods. That is, when the value of the corresponding flag (intra_subpartitions_mode_flag) is '0', it means that a general intra prediction is performed without dividing the target block into subblocks. On the other hand, use of an MTS may be limited by the supported sizes of extra transforms (DST-7 and DCT-8) (supported up to a maximum of 32×32, described above). That is, an MTS may be used only when the width and the height of the target block are 32 or less. That is, when any one among the width and the height exceeds 32, DCT-II, which is a default transform (*), is performed (use of an MTS is not allowed).

cu_sbt_flag indicates whether the transform is a subblock transform (sbt) in which only a part of a target block goes through a transform process. That is, when the value of u_sbt_flag is '0', it means that it is not a subblock transform (sbt) in which only a part of the target block goes through a transform process.

Hereinafter, a valid area (hereinafter, a valid MTS area) will be described in detail.

Figure 11:
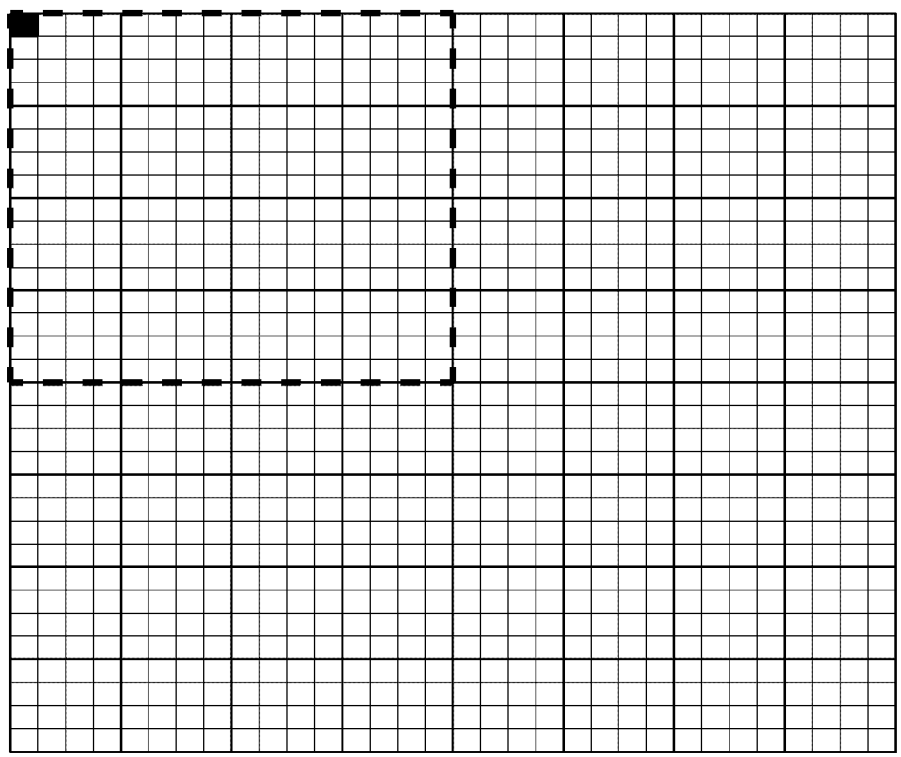
FIG. 11 is a view showing a valid MTS area marked with a bold line in a 32×32 decoding target block.

FIG. 11 is a view showing an example of a valid MTS area marked with a bold line in a 32×32 decoding target block.

Referring to FIG. 11, the 16×16 area on the upper-left side excluding the DC coefficient becomes a valid MTS area. That is, the upper-left 16×16 area excluding the 1×1 (DC)

area is a valid MTS area. For example, when the positions of all nonzero coefficients in a target block belong to the valid MTS area, an MTS may be applied, and when one or more nonzero coefficients values are out of the valid MTS area, an MTS may not be applied, and DCT-II, which is a default transform (*), is performed. This is a concept the same as that of the zero-out area described above. That is, as if the upper-left 16×16 area becomes a valid area and the other area becomes a zero-out area when a 32×32 target block uses an MTS (i.e., DST-7 or DCT-8), an MTS (i.e., DST-7 or DCT-8) may be applied when all nonzero coefficients in the 32×32 target block are located in the upper-left 16×16 area. However, exceptionally, when there is one nonzero coefficient in the block and its position is DC (1×1), an MTS may not be applied, and DCT-II, which is a default transform (*), is performed.

As a result, in this embodiment, a valid MTS area should be confirmed to determine whether an MTS may be applied, and the following two conditions should be confirmed to confirm a valid MTS area.
  (a) Whether the position is DC (1×1) when there is one nonzero coefficient in the block.
  (b) Whether all nonzero coefficients in the block are located in the upper-left 16×16 area.

In order to confirm condition (a), information on the last position may be used. Here, the last position means the position of a nonzero coefficient located last in the scan order within a target block, i.e., the last significant coefficient. For example, information on the last subblock including the last position, i.e., the last nonzero coefficient, may be used. For example, when the position of the last subblock is not (0,0), condition (a) may be satisfied. In other words, when the position of the last subblock in the order of scanning the subblocks within a target block is not '0' (greater than 0), condition (a) may be satisfied. Alternatively, when the position of the last subblock is '0', information on the last scan position indicating the relative position of the last position in a corresponding subblock may be used. For example, when the last scan position in the order of scanning the coefficients within a corresponding subblock is not '0' (greater than 0), condition (a) may be satisfied (see FIG. 12). In addition, as mentioned above, the MTS of the present invention is applied to a luma block.

In order to confirm condition (b), subblock information including one or more nonzero coefficients may be used. Here, subblock information including one or more nonzero coefficients may be confirmed by the value of sb_coded_flag of a corresponding subblock. When the flag value is '1' (sb_coded_flag=1), it means that one or more nonzero coefficients are located in the corresponding subblock, and when sb_coded_flag=0, it means that all coefficients in the subblock are zero. That is, when the positions of all subblocks in a target block, of which the value of sb_coded_flag is '1', are between (0,0) and (3,3), condition (b) may be satisfied. On the contrary, when even one of the subblocks in the target block, of which the value of sb_coded_flag is '1', is out of the position of (0,0) to (3,3), condition (b) cannot be satisfied. In other words, when even one of the subblocks in a target block, of which the value of sb_coded_flag is '1', has an x-coordinate or y-coordinate value greater than 3, condition (b) cannot be satisfied (see FIG. 13). In another embodiment, when the value of sb_coded_flag is '1' in the order of scanning the subblocks within the target block and a first subblock having an x-coordinate or y-coordinate value greater than 3 is found, condition (b) may be set to false, and a process of confirming a subblock, of which the value of sb_coded_flag is '1', that comes thereafter in the scan order may be omitted (see FIG. 13). In addition, as mentioned above, the MTS of the present invention is applied to a luma block.

Figure 12:
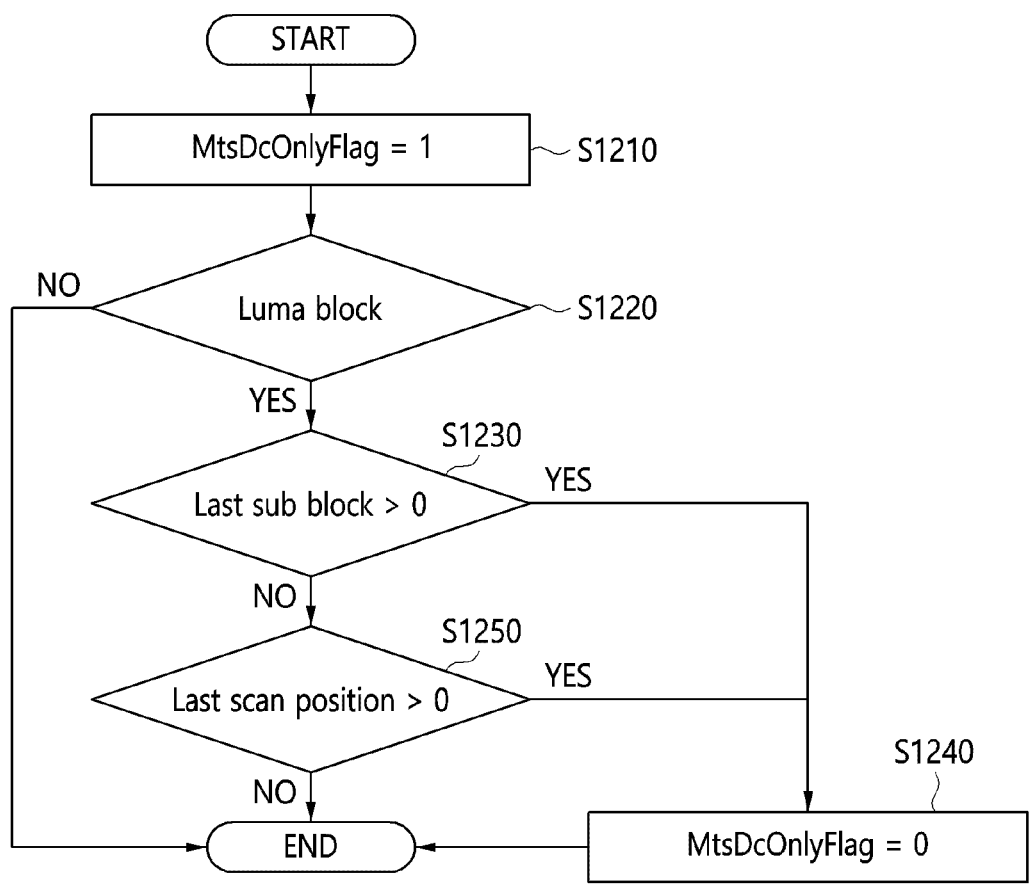
FIG. 12 is a flowchart illustrating a method of determining a valid MTS according to an embodiment of the present invention.

FIG. 12 is a flowchart illustrating a method of determining a valid MTS according to an embodiment of the present invention. The embodiment of FIG. 12 relates to a method of confirming condition (a) among the two conditions for confirming a valid MTS area described above. Each of the steps in FIG. 12 may be performed in the video decoding device.

Referring to FIG. 12, the video decoding device sets MtsDcOnlyFlag to '1' (S1210). MtsDcOnlyFlag may indicate whether there is one nonzero coefficient in a block and its position is DC. For example, when there is one nonzero coefficient in a block and its position is DC, MtsDcOnlyFlag has a value of '1', and in other cases, MtsDcOnlyFlag has a value of '0'. At this point, the video decoding device may apply an MTS when MtsDcOnlyFlag has a value of '0'. The reason for setting MtsDcOnlyFlag to '1' at step S1210 is to re-set MtsDcOnlyFlag to '0' when the corresponding block satisfies the condition that only one nonzero coefficient in the block is not at the DC position, and not to apply an MTS in other cases.

Next, the video decoding device determines whether the target block is a luma block (S1220). The reason of determining whether the target block is a luma block is since an MTS is applied only to a luma block as described above.

Next, the video decoding device determines whether the last subblock is greater than 0 (S1230), and when the last subblock is greater than 0, the video decoding device sets MtsDcOnlyFlag to '0' (S1240), and terminates the process.

When the last subblock is not greater than 0 as a result of the determination at step S1230, the video decoding device determines whether the last scan position is greater than 0 (S1250).

When the last scan position is greater than 0 as a result of the determination at step S1250, the video decoding device sets MtsDcOnlyFlag to '0' (S1240), and terminates the process.

When the last scan position is not greater than 0 as a result of the determination at step S1250, the video decoding device terminates the process.

According to this embodiment, when the last subblock is greater than 0 or the last scan position is greater than 0, MtsDcOnlyFlag is set to '0', and MtsDcOnlyFlag is set to '1' in other cases.

Thereafter, in determining whether or not to apply an MTS, MtsDcOnlyFlag is confirmed, and when MtsDcOnlyFlag has a value of '1', an MTS is not applied, and DCT-II, which is a default transform, may be applied.

Figure 13:
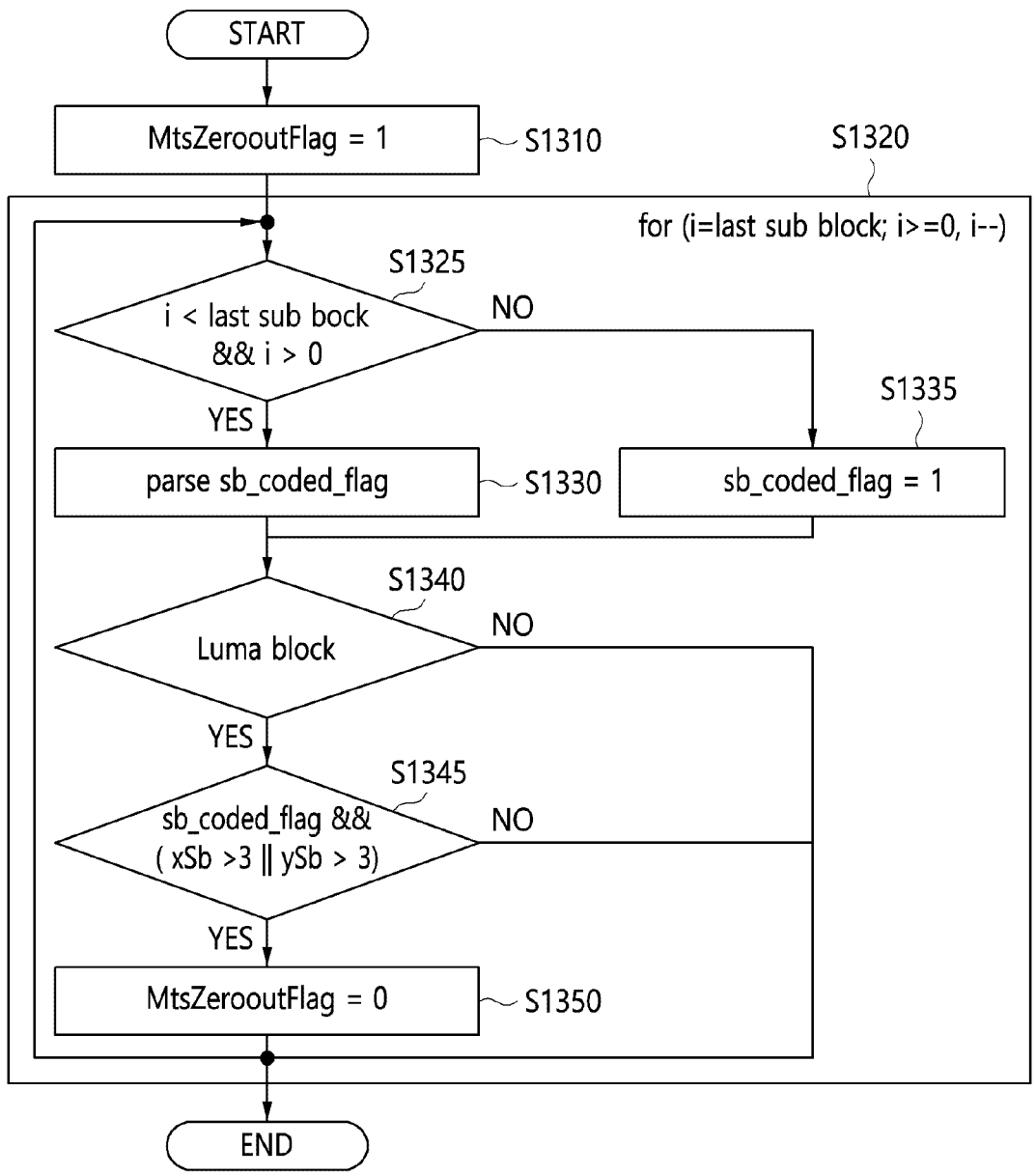
FIG. 13 is a flowchart illustrating a method of determining a valid MTS according to another embodiment of the present invention.

FIG. 13 is a flowchart illustrating a method of determining a valid MTS according to another embodiment of the present invention. The embodiment of FIG. 13 specifically shows a method of confirming condition (b) among the two conditions for confirming a valid MTS area described above. Each of the steps in FIG. 13 may be performed in the video decoding device.

Referring to FIG. 13, the video decoding device sets MtsZerooutFlag to '1' (S1305). MtsZerooutFlag indicates whether nonzero coefficients in a block exist in a zero-out area. For example, when at least one of nonzero coefficients in a block exists in a zero-out area, MtsZerooutFlag has a value of '0', and when all the nonzero coefficients in the block do not exist in a zero-out area, MtsZerooutFlag may have a value of '1'. In this embodiment, the initial value of MtsZerooutFlag is set to '1' assuming that all nonzero coefficients in the block do not exist in a zero-out area, and when the condition of zero-out area and the condition of nonzero coefficient are simultaneously satisfied, MtsZerooutFlag may be set to '0'. At this point, when MtsZerooutFlag having a value of '0' exists, an explicit MTS may not be applied.

Next, the video decoding device sets the initial value of variable i as the value of the last subblock, and repeats the process of steps S1325 to S1350 until the value of variable i becomes 0 by subtracting the value of variable i by 1 (S1320). The purpose of repeating the iteration of step S1320 is to confirm the value of sb_coded_flag in all subblocks from the last subblock to the first subblock. As described above, when the corresponding flag value is '1', it means that one or more nonzero coefficients exist in the corresponding subblock, and when the corresponding flag value is '0', it means that a nonzero coefficient does exist in the corresponding subblock. Therefore, referring to FIG. 11, when all subblocks in a target block, of which the value of sb_coded_flag is '1', exist only between (0, 0) and (3, 3), i.e., exist only between 0 and 8, with reference to variable i, it may be determined that condition (b) for applying an explicit MTS is satisfied.

Next, the video decoding device determines whether the condition that variable i is smaller than the last subblock (i<last subblock) and larger than 0 (i>0) is satisfied (S1325). For example, since the initial value of variable i is set to a value the same as that of the last subblock when the iteration of step S1320 is first executed, the condition of step S1325 is not satisfied.

When the condition that variable i is smaller than the last subblock (i<last subblock) and larger than 0 (i>0) is satisfied as a result of the determination at step S1325, sb_coded_flag is parsed (S1330), and when the two conditions are not satisfied at the same time, sb_coded_flag is set to '1' (S1335).

At this point, the parsed sb_coded_flag indicates whether one or more nonzero coefficients exist in a corresponding subblock. When one or more nonzero coefficients exist in a subblock, sb_coded_flag has a value of '1', and when there is no nonzero coefficient in a subblock, sb_coded_flag has a value of '0'.

On the other hand, step S1335 is performed only when i indicates the last subblock and the first subblock. That is, since the last position coefficient is included in the last subblock, the value of sb_coded_flag is parsed as a value of '1', and since a DC coefficient exists in the first subblock, the value of sb_coded_flag is parsed as a value of '1'.

Next, the video decoding device determines whether the corresponding block is a luma block (S1340). The reason of determining whether the target block is a luma block is since the MTS is applied only to a luma block as described above.

When the corresponding block is a luma block as a result of the determination at step S1340, it is determined whether the condition of "sb_coded_flag && (xSb>3 II ySb>3)" is satisfied (S1345), and when the condition of step S1345 is satisfied, MtsZerooutFlag is set to '0' (S1350).

According to this embodiment, when at least one nonzero coefficient is found in a subblock other than subblock (3, 3), i.e., a zero-out area, in a target block, MtsZerooutFlag is set to '0', and it may be determined that an explicit MTS cannot be applied.

Figure 14:
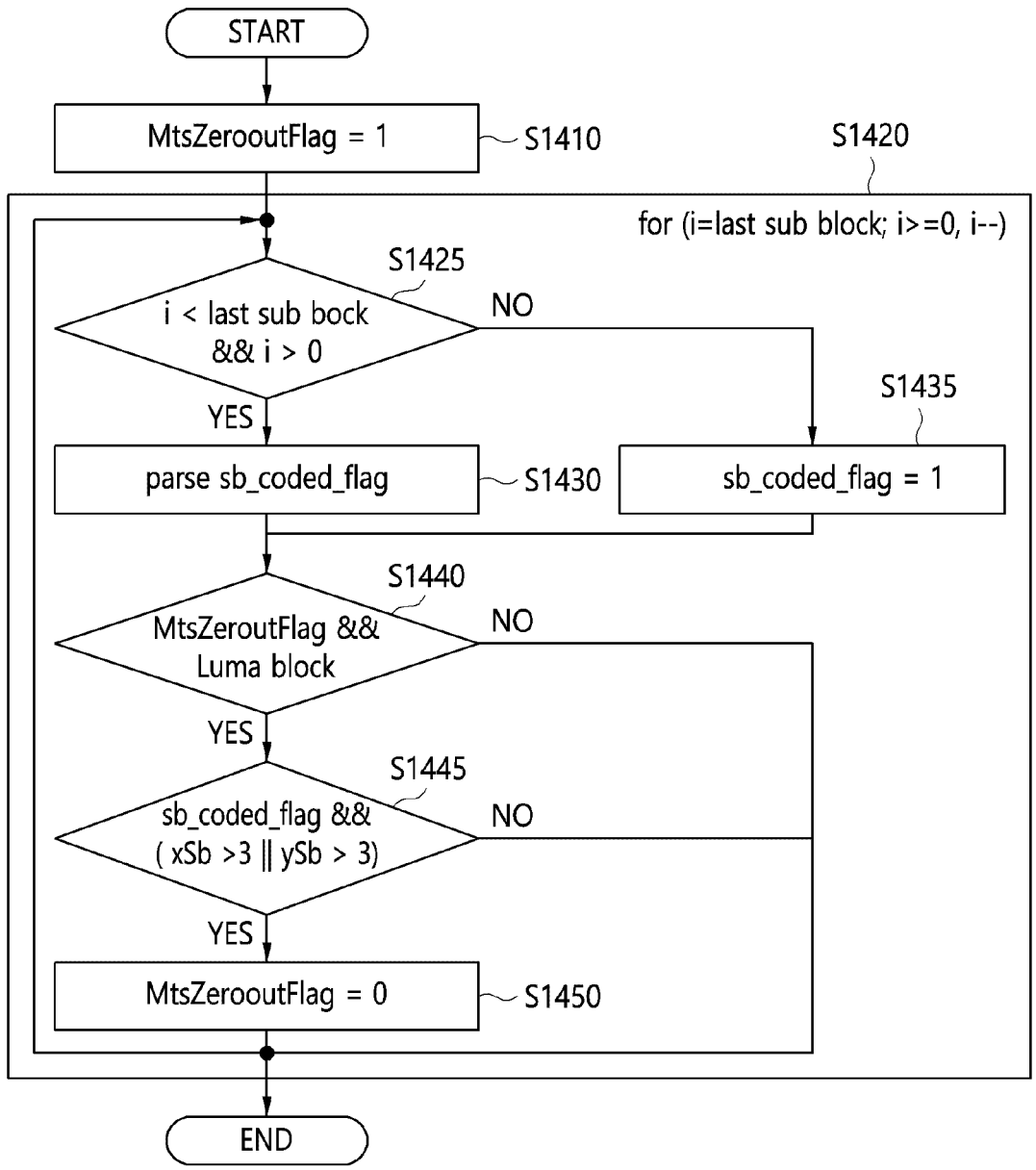
FIG. 14 is a flowchart illustrating a method of determining a valid MTS according to still another embodiment of the present invention.

FIG. 14 is a flowchart illustrating a method of determining a valid MTS according to still another embodiment of the present invention. The embodiment of FIG. 14 specifically shows a method of confirming condition (b) among the two conditions for confirming a valid MTS area described above. However, there is a difference in that although a valid MTS area is confirmed by confirming sb_coded_flag of all subblocks in the embodiment of FIG. 13, in the embodiment of FIG. 14, when the first invalid MTS is found, sb_coded_flag does not need to be confirmed thereafter. Each of the steps in FIG. 14 may be performed in the video decoding device.

Referring to FIG. 14, the video decoding device sets MtsZerooutFlag to '1' (S1405). MtsZerooutFlag indicates whether nonzero coefficients in a block exist in a zero-out area. For example, when at least one of nonzero coefficients in a block exists in a zero-out area, MtsZerooutFlag has a value of '0', and when all the nonzero coefficients in the block do not exist in a zero-out area, MtsZerooutFlag may have a value of '1'. In this embodiment, the initial value of MtsZerooutFlag is set to '1' assuming that all nonzero coefficients in the block do not exist in a zero-out area, and when the condition of zero-out area and the condition of nonzero coefficient are simultaneously satisfied, MtsZerooutFlag may be set to '0'. At this point, when MtsZerooutFlag having a value of '0' exists, an explicit MTS may not be applied.

Next, the video decoding device sets the initial value of variable i as the value of the last subblock, and repeats the process of steps S1425 to S1450 until the value of variable i becomes 0 by subtracting the value of variable i by 1 (S1420). The purpose of repeating the iteration of step S1420 is to confirm the value of sb_coded_flag in all subblocks from the last subblock to the first subblock. As described above, when the value of sb_coded_flag is '1', it means that one or more nonzero coefficients exist in the corresponding subblock, and when the value of sb_coded_flag is '0', it means that a nonzero coefficient does exist in the corresponding subblock. Therefore, referring to FIG. 16, when all subblocks in a target block, of which the value of sb_coded_flag is '1', exist only between (0, 0) and (3, 3), i.e., exist only between 0 and 8, with reference to variable i, it may be determined that condition (b) for applying an explicit MTS is satisfied.

Next, the video decoding device determines whether the condition that variable i is smaller than the last subblock (i<last subblock) and larger than 0 (i>0) is satisfied (S1425). For example, since the initial value of variable i is set to a value the same as that of the last subblock when the iteration of step S1420 is first executed, the condition of step S1425 is not satisfied.

When the condition that variable i is smaller than the last subblock (i<last subblock) and larger than 0 (i>0) is satisfied as a result of the determination at step S1425, sb_coded_flag is parsed (S1430), and when the two conditions are not satisfied at the same time, sb_coded_flag is set to '1' (S1435).

At this point, the parsed sb_coded_flag indicates whether one or more nonzero coefficients exist in a corresponding subblock. When one or more nonzero coefficients exist in a subblock, sb_coded_flag has a value of '1', and when there is no nonzero coefficient in a subblock, sb_coded_flag has a value of '0'.

On the other hand, step S1435 is performed only when i indicates the last subblock and the first subblock. That is, since the last position coefficient is included in the last subblock, the value of sb_coded_flag is parsed as a value of '1', and since a DC coefficient exists in the first subblock, the value of sb_coded_flag is parsed as a value of '1'.

Next, the video decoding device determines whether the condition of 'MtsZerooutFlag && luma block' is satisfied (S1440).

When the condition of 'MtsZerooutFlag && luma block' is satisfied as a result of the determination at step S1440, it is further determined whether the condition of 'sb_coded_flag && (xSb>3|| ySb>3)' is satisfied (S1445), and when the condition of 'sb_coded_flag && (xSb>3|| ySb>3)' is satisfied, MtsZerooutFlag is set to '0' (S1450).

When the condition of 'MtsZerooutFlag && luma block' is not satisfied as a result of the determination at step S1440, the process in the corresponding subblock is terminated.

According to this embodiment, when the value of MtsZerooutFlag is set to '0' at least once in a corresponding variable i, i.e., in a corresponding subblock, a false value is derived at step S1440 in the next iteration of variable i-1, and the value of sb_coded_flag does not need to be confirmed anymore.

On the other hand, when the decoding target block satisfies both the conditions of (a) and (b), use of an explicit MTS is finally determined, and transform information actually used in the corresponding block is transmitted in the form of an index (mts_idx). On the contrary, when both the conditions are not satisfied, DCT-II, which is a default transform (*), is used (see FIG. 15). Table 5 shows the horizontal axis and vertical axis transform types according to the value of mts_idx.

TABLE 5

| mts_idx[x0][y0] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

In Table 5, trTypeHor means a horizontal axis transform type, and trTypeVer means a vertical axis transform type. Values of the transform types in Table 5 mean trType values in Table 2. For example, when the value of mts_idx is '2', DCT-8 (2) may be used as the horizontal axis transform, and DST-7 (1) may be used as the vertical axis transform.

In the present invention, all the cases of using, performing, and applying DCT-II, which is a default transform (*) mentioned above, may be replaced with an expression of "derives the mts_idx value as '0'". That is, this is since that when the value of mts_idx is '0', DCT-II (0) is set for both the horizontal axis and vertical axis transforms.

In the present invention, the binarization method of mts_idx uses a truncated rice (TR) method. The value of cMax, which is a parameter value for TR, is "4", and the value of cRiceParam is '0'. Table 6 shows codewords of MTS indexes.

TABLE 6

| mts_idx | codewords |
|---|---|
| 0 | 0 |
| 1 | 10 |
| 2 | 110 |
| 3 | 1110 |
| 4 | 1111 |

Referring to Table 6, it may be confirmed that a corresponding codeword is '0' when the value of mts_idx is '0', a corresponding codeword is '10' when the mts_idx value is '1', a corresponding codeword is '110' when the mts_idx value is '2', a corresponding codeword is '1110' when the mts_idx value is '3', and a corresponding codeword is '1111' when the mts_idx value is '4'.

Figure 15:
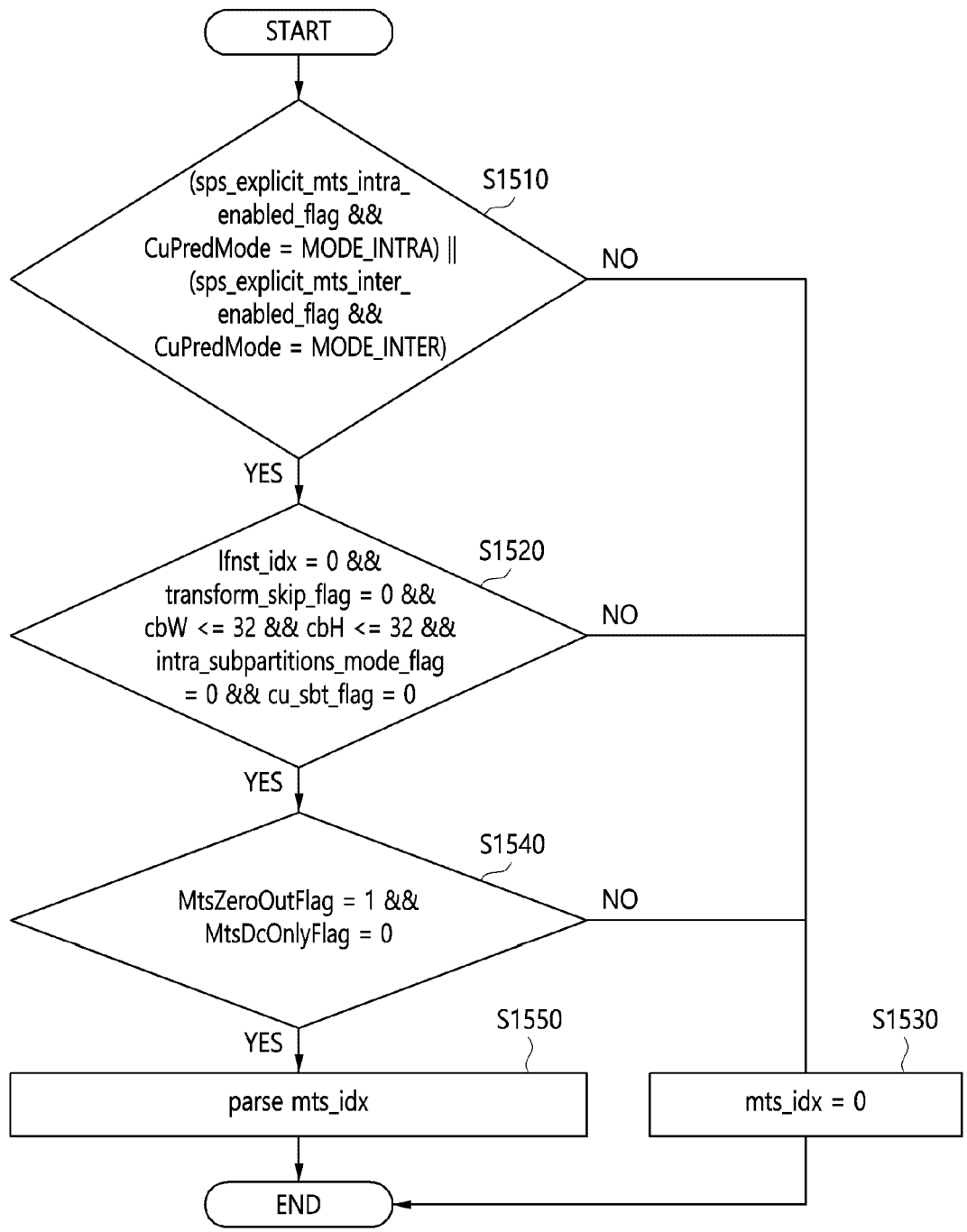
FIG. 15 is a flowchart illustrating a method of determining whether or not to apply an explicit MTS function according to an embodiment of the present invention.

FIG. 15 is a flowchart illustrating a method of determining whether or not to apply an explicit MTS function according to an embodiment of the present invention. Each of the steps in FIG. 15 may be performed in the video decoding device.

Referring to FIG. 15, the video decoding device determines whether the condition of "(sps_explicit_mts_intra_enabled_flag && CuPredMode=MODE_INTRA) II (sps_explicit_mts_inter_enabled_flag && CuPredMode=MODE_INTER)" is satisfied (S1510).

sps_explicit_mts_intra_enabled_flag is a flag indicating whether an explicit MTS is used for intra prediction, and sps_explicit_mts_intra_enabled_flag is a flag indicating whether an explicit MTS is used for inter prediction. sps_explicit_mts_intra_enabled_flag has a value of '1' when an explicit MTS is used for intra prediction, and has a value of '0' in other cases. sps_explicit_mts_intra_enabled_flag has a value of '1' when an explicit MTS is used for inter prediction, and has a value of '0' in other cases.

CuPredMode indicates whether a decoding target block is encoded by a predetermined prediction method. When a decoding target block is encoded in an intra prediction method, CuPredMode has a value of MODE_INTRA, and when the decoding target block is encoded in an inter prediction method, CuPredMode has a value of MODE_INTER.

Accordingly, when the decoding target block uses intra prediction and an explicit MTS, 'sps_explicit_mts_intra_enabled_flag && CuPredMode=MODE_INTRA' has a value of '1', and when the decoding target block uses inter prediction and an explicit MTS, 'sps_explicit_mts_inter_enabled_flag && CuPredMode=MODE_INTER' has a value of '1'. Accordingly, at step S1510, whether a decoding target block uses an explicit MTS may be determined by confirming values of sps_explicit_mts_intra_enabled_flag, sps_explicit_mts_inter_enabled_flag, and CuPredMode.

When the condition of step S1510 is satisfied, the video decoding device determines whether the condition of "lfnst_idx=0 && transform_skip_flag=0 && cbW<32 && cbH<32 && intra_subpartitions_mode_flag=0 && cu_sbt_flag=0" is satisfied (S1520).

Here, the value of lfnst_idx indicates a secondary transform, and when lfnst_idx=0, it means that a secondary transform is not used.

The value of transform_skip_flag indicates whether transform skip is applied to the current block. That is, it indicates whether the transform process is omitted for the current block. When transform_skip_flag=0, it indicates that the transform skip is not applied to the current block.

cbW and cbH indicate the width and the height of the current block, respectively. As described above, the maximum size of DCT-II, which is a default transform, is supported up to 64×64, and the maximum size of DST-7 and DCT-8, which are extra transforms, is supported up to 32×32. For example, when the size of a decoding target block is 64×64, one 64×64 DCT-II is applied in the transform process. That is, when one or more among the width and the height of the decoding target block is greater than 32 (exceeds 32), a default transform (*) is directly applied without applying an MTS. Therefore, in order for MTS to be applied, both cbW and cbH should have a value of 32 or less.

intra_subpartitions_mode_flag indicates whether an intra sub-partition mode is applied. The intra sub-partition mode is one of intra prediction methods and indicates that a target block is divided into a plurality of subblocks and goes through a process of prediction, transform, and quantization. That is, when the corresponding flag value (intra_subpartitions_mode_flag) is '0', it means that a general intra prediction is performed without dividing the target block into subblocks.

cu_sbt_flag indicates whether a subblock transform (sbt), in which only a part of a target block goes through a transform process, is applied. That is, when the value of cu_sbt_flag is '0', it means that a subblock transform (sbt), in which only a part of the target block goes through a transform process, is not applied.

Accordingly, whether a decoding target block may apply an explicit MTS may be determined through whether the condition of step S1520 is satisfied.

When the condition of step S1510 is not satisfied, the video decoding device sets the value of mts_idx to '0' (S1530), and terminates the process.

When the condition of step S1520 is satisfied, the video decoding device determines whether the condition of 'MtsZeroOutFlag=1 && MtsDcOnlyFlag=0' is satisfied (S1540).

MtsZerooutFlag indicates whether nonzero coefficients in a block exist in a zero-out area. When at least one of the nonzero coefficients in a block exists in a zero-out area, MtsZerooutFlag has a value of '0', and when all the nonzero coefficients in a block do not exist in a zero-out area, MtsZerooutFlag may have a value of '1'. At this point, the value of MtsZerooutFlag may be determined by performing the process of FIG. 13 or FIG. 14.

MtsDcOnlyFlag indicates whether there is one nonzero coefficient in a block and its position is DC. When there is one nonzero coefficient in a block and its position is DC, MtsDcOnlyFlag has a value of '1', and in other cases, MtsDcOnlyFlag has a value of '0'. At this point, the value of MtsDcOnlyFlag may be determined by performing the process of FIG. 12.

On the other hand, when the condition of step S1520 is not satisfied, the video decoding device sets the value of mts_idx to '0' (S1530), and terminates the process.

When the condition of step S1540 is satisfied, the video decoding device parses mts_idx (S1550), and terminates the process. At this point, the horizontal axis and vertical axis transform types according to the value of mts_idx may be assigned according to Table 5. At this point, the values of the transform types in Table 5 mean the trType values of Table 2. For example, when the value of mts_idx is '2', DCT-8 may be applied as the horizontal axis transform, and DST-7 may be applied as the vertical axis transform.

In addition, even when the condition of step S1540 is not satisfied, the video decoding device sets the value of mts_idx to '0' (S1530), and terminates the process.

Figure 16:
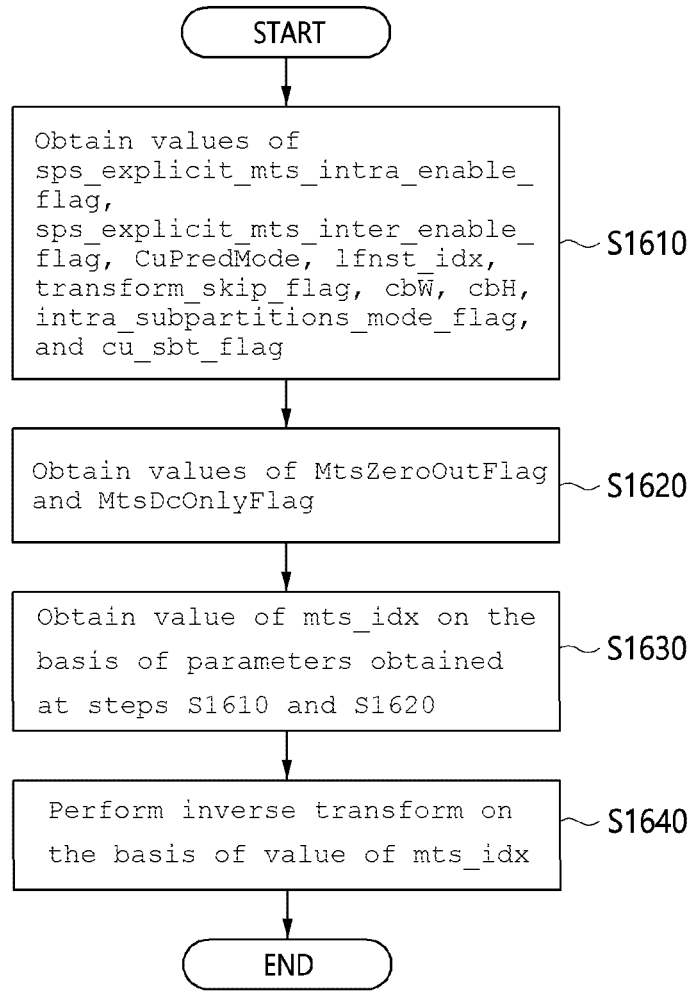
FIG. 16 is a flowchart illustrating a method of performing an inverse transform on the basis of parameters related transform according to another embodiment of the present invention.

FIG. 16 is a flowchart illustrating a method of performing an inverse transform on the basis of parameters related transform according to another embodiment of the present invention. Each of the steps in FIG. 16 may be performed in the video decoding device, for example, may be performed by the inverse transform unit of the video decoding device.

Referring to FIG. 16, the video decoding device obtains values of sps_explicit_mts_intra_enable_flag, sps_explicit_mts_inter_enable_flag, CuPredMode, lfnst_idx, transform_skip_flag, cbW, cbH, intra_subpartitions_mode_flag, and cu_sbt_flag (S1610). At this point, those indicated by sps_explicit_mts_intra_enable_flag, sps_explicit_mts_inter_enable_flag, CuPredMode, lfnst_idx, transform_skip_flag, cbW, cbH, intra_subpartitions_mode_flag, and cu_sbt_flag are described in detail in the description of FIG. 15, and the parameters are used to determine whether a decoding target block may apply an explicit MTS.

Next, the video decoding device obtains values of MtsZeroOutFlag and MtsDcOnlyFlag (S1620). At this point, MtsZeroOutFlag may be obtained by performing the process of FIG. 13 or 14, and MtsDcOnlyFlag may be obtained by performing the process of FIG. 12.

Next, the video decoding device obtains the value of mts_idx on the basis of the parameters obtained at steps S1610 and S1620 (S1630). That is, the video decoding device obtains the value of mts_idx on the basis of sps_explicit_mts_intra_enable_flag, sps_explicit_mts_inter_enable_flag, CuPredMode, lfnst_idx, transform_skip_flag, cbW, cbH, intra_subpartitions_mode_flag, cu_sbt_flag, MtsZeroOutFlag, and MtsDcOnlyFlag. At this point, mts_idx may be obtained by performing the process of FIG. 15.

Next, the video decoding device performs an inverse transform on the basis of mts_idx (S1640). The inverse transform applied according to the value of mts_idx may be configured according to Table 5 and Table 2. For example, when the value of mts_idx is '2', DCT-8 may be applied in the horizontal axis direction, and DST-7 may be applied in the vertical axis direction.

Meanwhile, although not shown in the drawing, sps_explicit_mts_intra_enable_flag, sps_explicit_mts_inter_enable_flag, CuPredMode, lfnst_idx, transform_skip_flag, cbW, cbH, intra_subpartitions_mode_flag, cu_sbt_flag, MtsZeroOutFlag, and MtsDcOnlyFlag may be set in order to set whether or not to use an implicit MTS from the viewpoint of the video encoding device. In the embodiments described above, the methods are described on the basis of a flowchart as a series of steps or blocks, but the present invention is not limited to the order of the steps, and some steps may occur in an order different from those of the other steps described above or together with the other steps. In addition, those skilled in the art will understand that the steps shown in the flowchart are not exclusive and may include other steps, or one or more steps of the flowchart may be deleted without affecting the scope of the present invention.

The embodiments described in this document may be implemented and performed on a processor, a microprocessor, a controller, or a chip. For example, the functional units shown in each drawing may be implemented and performed on a computer, a processor, a microprocessor, a controller, or a chip. In this case, information on instructions or algorithms for implementation may be stored in a digital storage medium.

In addition, the decoding device and the encoding device to which the present invention is applied may be included in a multimedia broadcasting transmission and reception device, a mobile communication terminal, a home cinema video device, a digital cinema video device, a surveillance camera, a video conversation device, a real-time communication device such as a video communication device, a mobile streaming device, a storage medium, a camcorder, a video on demand (VoD) service providing device, an Over the top video (OTT video) device, an Internet streaming service providing device, a three-dimensional (3D) video device, a videophone video device, a transportation means terminal (e.g., a vehicle terminal, an airplane terminal, a ship terminal, etc.), a medical video device, and the like, and may be used to process video signals or data signals. For example, the OTT video (Over the top video) device may include a game console, a Blu-ray player, an Internet-connected TV, a home theater system, a smart phone, a tablet PC, a digital video recorder (DVR), and the like.

In addition, the processing method to which the present invention is applied may be produced in the form of a program executed by a computer, and may be stored in a computer-readable recording medium. Multimedia data having a data structure according to the present invention may also be stored in the computer-readable recording medium.

The computer-readable recording medium includes all kinds of storage devices and distributed storage devices in which computer-readable data are stored. The computer-readable recording medium may include, for example, a Blu-ray Disc (BD), a Universal Serial Bus (USB), ROM, PROM, EPROM, EEPROM, RAM, CD-ROM, a magnetic tape, a floppy disk, and an optical data storage device. In addition, the computer-readable recording medium includes a medium implemented in the form of a carrier wave (e.g., transmission through the Internet). In addition, a bitstream generated by the encoding method may be stored in a computer-readable recording medium or transmitted through a wired or wireless communication network.

In addition, the embodiments of the present invention may be implemented as a computer program product by a program code, and the program code may be executed in a computer according to an embodiment of the present invention. The program code may be stored on a carrier that can be read by a computer.

What is claimed is:

1. A video decoding method performed by a video decoding device, the method comprising:

obtaining a parameter indicating whether a multiple transform set (MTS) can be applied to a decoding block, and information on a size of the decoding block;

determining a transform type of the decoding block based on at least one among the parameter indicating whether the multiple transform set (MTS) can be applied to the decoding block, and the information on the size of the decoding block; and setting a zero-out area of the decoding block based on at least one among the parameter indicating whether the multiple transform set (MTS) can be applied to the decoding block, and the information on the size of the decoding block, wherein whether or not syntax information with regard to a maximum size of a transform applied to the decoding block is signaled to the video decoding device depends on whether a block size is greater than a predetermined size, and wherein when the size of the decoding block is smaller than 16×16, there is no zero-out area of the decoding block.

* * * * *